United States Patent
Hakuta et al.

(10) Patent No.: US 10,269,339 B2
(45) Date of Patent: Apr. 23, 2019

(54) SOUNDPROOFING STRUCTURE, PARTITION STRUCTURE, WINDOW MEMBER, AND CAGE

(71) Applicant: FUJIFILM Corporation, Tokyo (JP)

(72) Inventors: Shinya Hakuta, Ashigarakami-gun (JP); Shogo Yamazoe, Ashigarakami-gun (JP); Hiroshi Komatsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/119,243

(22) Filed: Aug. 31, 2018

(65) Prior Publication Data

US 2019/0019490 A1    Jan. 17, 2019

Related U.S. Application Data

(63) Continuation of application No. PCT/JP2017/012304, filed on Mar. 27, 2017.

(30) Foreign Application Priority Data

Mar. 29, 2016 (JP) .................. 2016-065910
Apr. 28, 2016 (JP) .................. 2016-090849

(51) Int. Cl.
*E04B 1/82* (2006.01)
*E04B 1/84* (2006.01)
(Continued)

(52) U.S. Cl.
CPC .......... *G10K 11/172* (2013.01); *E04B 1/8209* (2013.01); *E04B 2001/8433* (2013.01); *G03B 21/22* (2013.01)

(58) Field of Classification Search
CPC .......... G10K 11/172; E04B 2001/8433; E04B 1/8209; G03B 21/22
(Continued)

(56) References Cited

U.S. PATENT DOCUMENTS 8,469,145 B2 * 6/2013 Nonogi .................. B32B 3/266
                                                        181/291
2013/0020148 A1   1/2013 Nakajima et al.

FOREIGN PATENT DOCUMENTS

JP          3040527 U      8/1997
JP       2003-239226 A     8/2003
(Continued)

OTHER PUBLICATIONS

International Search Report, issued in PCT/JP2017/012304, dated Jun. 20, 2017.
(Continued)

*Primary Examiner* — Jeremy A Luks
(74) *Attorney, Agent, or Firm* — Birch, Stewart, Kolasch & Birch, LLP

(57) ABSTRACT

Provided is a soundproofing structure including: a plate-like member which has a plurality of through-holes passing therethrough in a thickness direction, in which in a case where an average opening diameter of the through-holes is 0.1 μm or greater and less than 100 μm, and in a case where the average opening diameter of the through-holes is set as phi (μm) and a thickness of the plate-like member is set as t (μm), an average opening ratio rho of the through-holes is greater than 0 and less than 1 and falls in a range where a center is rho_center=(2+0.25×t)×phi$^{-1.6}$, a lower limit is rho_center−(0.052×(phi/30)$^{-2}$), and an upper limit is rho_center+(0.795×(phi/30)$^{-2}$).

20 Claims, 21 Drawing Sheets

(51) Int. Cl.
*G03B 21/22* (2006.01)
*G10K 11/172* (2006.01)

(58) Field of Classification Search
USPC .......................................................... 181/293
See application file for complete search history.

(56) References Cited

FOREIGN PATENT DOCUMENTS

| JP | 2008-9014 A | 1/2008 |
| JP | 2009-139556 A | 6/2009 |
| JP | 2011-149200 A | 8/2011 |
| JP | 2015-152794 A | 8/2015 |

OTHER PUBLICATIONS

Written Opinion of the International Searching Authority, issued in PCT/JP2017/012304, dated Jun. 20, 2017.

* cited by examiner

SOUNDPROOFING STRUCTURE, PARTITION STRUCTURE, WINDOW MEMBER, AND CAGE

CROSS-REFERENCE TO RELATED APPLICATIONS

This application is a Continuation of PCT International Application No. PCT/JP2017/012304 filed on Mar. 27, 2017, which claims priority under 35 U.S.C § 119(a) to Japanese Patent Application No. 2016-065910 filed on Mar. 29, 2016 and Japanese Patent Application No. 2016-090849 filed on Apr. 28, 2016. Each of the above application(s) is hereby expressly incorporated by reference, in its entirety, into the present application.

BACKGROUND OF THE INVENTION

1. Field of the Invention

The present invention relates to a soundproofing structure and a partition structure, a window member, and a cage using the soundproofing structure.

2. Description of the Related Art

In many cases, typical noise is over frequencies in a broadband, a low frequency sound is felt as a pressure, a sound in a mid-range (approximately 1000 Hz to 4000 Hz) is heard as a loud sound since the structure of an ear is formed to be sensitive to the sound in that range, and a high frequency sound is felt to be harsh on the ears. Accordingly, it is necessary to take countermeasures for broadband noise in a broadband.

For example, as an example of wind noise, there is a noise having a sound pressure from a low frequency range to a high frequency range, such as white noise, and thus it is necessary to take countermeasures for broadband noise. Particularly, in the countermeasures for a noise inside various devices (such as office equipment such as a copying machine, home electric appliances such as a vacuum cleaner or an air cleaner, an automobile, and an electric train), since the size of a device is limited, a soundproofing structure capable of soundproofing in a small space has been required.

In the related art, as typical soundproofing materials for a noise of frequencies in a broadband, an urethane sponge, a glass wool, and the like have been used. However, in a case where the urethane sponge, the glass wool, and the like are used as the soundproofing materials, there is a problem in that soundproofing performance cannot be sufficiently obtained in a case where the size of the material in a device is limited because the material needs to have a suitable volume in order to increase the absorbance. Further, there is another problem in that the material is not strong enough to withstand the environment and deteriorates. In addition, since the material is fibrous, the environment is contaminated by fiber garbage. Accordingly, there are problems in that this material cannot be used in a clean room environment, an environment with precision equipment, or a manufacturing site where contamination becomes a problem and the material affects a duct fan and the like. Further, the holes of the urethane sponge and the glass wool are three-dimensional pores, and thus the light transmittance is low, which is problematic.

As a soundproofing structure that absorbs a sound in a specific frequency band, a soundproofing structure utilizing membrane vibration and a soundproofing structure utilizing Helmholtz resonance may be exemplified.

Since sound absorption occurs at the resonance frequency of membrane vibration in the soundproofing structure utilizing membrane vibration, sound absorption is increased at the resonance frequency, but sound absorption is decreased at other frequencies. Therefore, it is difficult to widen the frequency band where the sound is absorbed.

As described in JP2008-9014A, a soundproofing structure utilizing Helmholtz resonance has a configuration of a closed space which is acoustically closed by disposing a shielding plate on a rear surface of a plate-like member in which a plurality of through-holes have been formed.

Such a soundproofing structure utilizing Helmholtz resonance is a structure formed by connecting a part controlled by a motion equation in which, when an external sound enters through-holes, the air in the through-holes is moved by the sound with a part controlled by a spring equation in which the air in the closed space repeatedly expands and contracts due to the sound. According to the respective equations, the movement of the air in the through-holes shows a coil-like behavior in which the pressure phase is advanced by 90 degrees further than the local velocity phase and the movement of the air in the closed space shows a capacitor-like behavior in which the pressure phase is delayed by 90 degrees further than the local velocity phase. Therefore, the Helmholtz resonance is a so-called LC series circuit as an equivalent circuit of a sound as a whole and has resonance to be determined by the area and the length of the through-holes and the volume of the closed space. At the time of this resonance, multiple sounds reciprocate through the through-holes and strong sound absorption occurs at a specific frequency due to the friction between the sounds and the through-holes during the reciprocation.

Further, JP2015-152794A describes, as a soundproofing structure having through-holes without a closed space, a soundproofing sheet which includes a sheet having a plurality of through-holes, and a sound collecting portion which has through-holes arranged such that the centers thereof substantially coincide with the through-holes of the sheet, has a shape in which the diameter increases along with an increase in distance from the sheet, and is provided outside the sheet.

JP2009-139556A discloses a sound absorbing body which is partitioned by a partition wall serving as a frame and closed by a rear wall (rigid wall) formed of a plate-like member and in which the front portion is covered by a film material (film-like sound absorbing material) that covers an opening portion of a cavity forming the opening portion, a pressure plate is placed thereon, and resonance holes for Helmholtz resonance are formed in a region (corner portion) within a range of 20% of the dimension of the surface of the film-like sound absorbing material from a fixed end of a peripheral edge of the opening portion which is a region where displacement due to sound waves of the film material is the least likely to occur. In this sound absorbing body, the cavity is blocked except for resonance holes. This sound absorbing body exhibits both a sound absorbing action using membrane vibration and a sound absorbing action using Helmholtz resonance.

SUMMARY OF THE INVENTION

In the configuration which is obtained by providing a closed space on the rear surface of a plate-like member in which a plurality of through-holes have been formed and in which a sound is absorbed using the Helmholtz resonance, as described in JP2008-9014A, a shielding plate that does not allow a sound to pass through the rear surface of the plate-like member becomes indispensable in order to prepare a closed space. Further, as a principle, a frequency band which is capable of sound absorption since the resonance is used is narrow, and the band is difficult to widen.

In order to solve such a problem, it has been attempted to provide a plurality of holes in a thickness direction or a horizontal direction or provide a plurality of spaces on the rear surface, but there are problems of an increase in size of the soundproofing structure because a plurality of cells need to be provided, complication of the structures or components because these need to be formed separately, and an increase in number of components.

Further, since a closed space is required to be provided on the rear side, there are problems in that the size of the volume of the closed space is increased and the ventilation properties or waste heat cannot be ensured.

Further, the above-described phenomenon in which the air in the closed space repeatedly expands and contracts due to the sound occurs according to a spring equation only in a case where the wavelength of the sound is sufficiently larger than the length of the closed space. In a case where the wavelength of the sound is approximately the same or smaller than the length of the closed space, a simple spring equation cannot be used since sound interference or resonance occurs in the closed space. Therefore, the premise of the Helmholtz resonance fails.

Meanwhile, in order to allow the closed space on the rear side to resonate as a spring with respect to a sound having a long wavelength, it is necessary to increase the size of the closed space according to the wavelength of the sound. Therefore, resonance does not occur in a case where the closed space is extremely small with respect to the wavelength.

Consequently, the upper limit or the lower limit of the size of the closed space with respect to the wavelength of the sound which is a target for soundproofing is limited in order to obtain the Helmholtz resonance.

For example, in consideration of the Helmholtz resonance with respect to the air at room temperature, the distance between the shielding plate and the plate-like member having through-holes needs to be shorter than approximately 3.4 mm as the first condition in order to correspond to 100000 Hz, and the distance therebetween needs to be shorter than 34 mm even in a case of 10000 Hz, and thus the upper limit of the size is determined in this manner. However, in this case, since the closed space is extremely small compared to 3.4 m which is a wavelength of 100 Hz, it is difficult to efficiently allow the Helmholtz resonance to occur. The frequency band of the audible range is extremely wide and spreads to three digits from 20 to 20000 Hz, and the sound outside this range can be felt by vibration or the like. This indicates that three or greater digits of wavelength ranges are involved. Therefore, in a case where a Helmholtz resonator is designed to absorb a sound on a high frequency side, it is difficult to allow the resonance to occur since the size of the closed space is extremely small with respect to the size of the wavelength on a low frequency side. Meanwhile, in a case where a Helmholtz resonator is designed to absorb a sound on a low frequency side, the premise of the Helmholtz resonance fails since the size of the closed space is extremely large with respect to the size of the wavelength on a high frequency side. Accordingly, in terms that resonance is used in the Helmholtz resonance and in terms of the behavior as a spring of a closed space, it is difficult to widen the band.

Further, the soundproofing sheet described in JP2015-152794A is a sheet which shields a sound by reflecting the sound according to the mass law using the weight of the sheet itself. The through-hole portions do not contribute to soundproofing, and the performance as close to the sound insulation performance of the original sheet as possible is ensured even in a case where the through-holes are opened by devising the structures around the through-holes. Therefore, there are problems in that the soundproofing performance higher than the mass law cannot be obtained and a sound cannot be satisfactorily absorbed because the sound is reflected.

A method of soundproofing by reflecting a sound is referred to as sound insulation. However, sound absorption is small and reflected noise in the noise inside a device is eventually released from another site in a case where soundproofing is made only by reflection of the sound, and thus noise is not suppressed in some cases. Further, this method is not effective for suppressing indoor reverberation. Therefore, in many situations where noise from a device or the like is soundproofed, in other words, soundproofing is required to be performed by absorption, the soundproofing sheet that reflects the sound cannot exhibit sufficient soundproofing performance.

Further, in JP2009-139556A, the rear wall of the partition wall serving as a frame is blocked by the plate-like member since the sound absorbing action using membrane vibration needs to be carried out according to the sound absorbing action using the Helmholtz resonance. Therefore, similar to JP2008-9014A, since the partition wall does not have the ability to pass air and heat therethrough, heat tends to be accumulated. Accordingly, this partition wall is not suitable for insulating sound from a device, an automobile, and the like.

An object of the present invention is to solve the above-described problems of the techniques of the related art and to provide a soundproofing structure which exhibits high soundproofing performance in a broad frequency band, can be lightweight, can be miniaturized, can ensure ventilation properties, and has a light transmittance.

As the result of intensive examination conducted by the present inventors in order to achieve the above-described object, it was found that the above-described problems can be solved by providing a soundproofing structure including: a plate-like member which has a plurality of through-holes passing therethrough in a thickness direction, in which an average opening diameter of the through-holes is 0.1 μm or greater and less than 100 μm, and in a case where the average opening diameter of the through-holes is set as phi (μm) and a thickness of the plate-like member is set as t (μm), an average opening ratio rho of the through-holes is greater than 0 and less than 1 and falls in a range where a center is $rho\_center=(2+0.25 \times t) \times phi^{-1.6}$, a lower limit is $rho\_center-(0.052 \times (phi/30)^{-2})$, and an upper limit is $rho\_center+(0.795 \times (phi/30)^{-2})$, thereby completing the present invention.

In other words, it was found that the above-described object can be achieved with the following configurations.

[1] A soundproofing structure comprising: a plate-like member which has a plurality of through-holes passing therethrough in a thickness direction, in which an average opening diameter of the through-holes is 0.1 μm or greater and less than 100 μm, and in a case where the average opening diameter of the through-holes is set as phi (μm) and a thickness of the plate-like member is set as t (μm), an average opening ratio rho of the through-holes is greater than 0 and less than 1 and falls in a range where a center is rho_center=(2+0.25×t)×phi$^{-1.6}$, a lower limit is rho_center−(0.052×(phi/30)$^{-2}$), and an upper limit is rho_center+(0.795×(phi/30)$^{-2}$).

[2] The soundproofing structure according to [1], in which the average opening ratio of the plurality of through-holes is 2% or greater.

[3] The soundproofing structure according to [1] or [2], in which a plurality of the plate-like members are arranged in the thickness direction.

[4] The soundproofing structure according to any one of [1] to [3], in which a surface roughness Ra of an inner wall surface of the through-hole is in a range of 0.1 μm to 10.0 μm.

[5] The soundproofing structure according to any one of [1] to [4], in which an inner wall surface of the through-hole is formed in a shape of a plurality of particles, and an average particle diameter of projections formed on the inner wall surface is in a range of 0.1 μm to 10.0 μm.

[6] The soundproofing structure according to any one of [1] to [5], in which a material for forming the plate-like member is a metal.

[7] The soundproofing structure according to any one of [1] to [6], in which a material for forming the plate-like member is aluminum.

[8] The soundproofing structure according to any one of [1] to [7], in which the plurality of through-holes are randomly arranged.

[9] The soundproofing structure according to any one of [1] to [8], in which the plurality of through-holes are formed of through-holes with two or more different opening diameters.

[10] The soundproofing structure according to any one of [1] to [9], in which the average opening diameter of the through-holes is in a range of 0.1 μm to 50 μm.

[11] The soundproofing structure according to any one of [1] to [10], in which at least some of the through-holes have a shape having a maximum diameter inside the through-holes.

[12] A partition structure comprising: the soundproofing structure according to any one of [1] to [11].

[13] A window member comprising: the soundproofing structure according to any one of [1] to [11].

[14] A cage comprising: the soundproofing structure according to any one of [1] to [11].

According to the present invention, it is possible to provide a soundproofing structure which exhibits high soundproofing performance in a broad frequency band, can be lightweight, can be miniaturized, can ensure ventilation properties, and has a light transmittance.

DESCRIPTION OF THE PREFERRED EMBODIMENTS

Hereinafter, the present invention will be described in detail.

The description of constituent elements below will be made based on representative embodiments of the present invention, but the present invention is not limited to such embodiments.

In the present specification, the numerical ranges shown using "to" indicate ranges including the numerical values described before and after "to" as the lower limits and the upper limits.

[Soundproofing Structure]

A soundproofing structure of the present invention includes a plate-like member which has a plurality of through-holes passing therethrough in a thickness direction, in which an average opening diameter of the through-holes is 0.1 μm or greater and less than 100 μm, and in a case where the average opening diameter of the through-holes is set as phi (μm) and a thickness of the plate-like member is set as t (μm), an average opening ratio rho of the through-holes is greater than 0 and less than 1 and falls in a range where a center is $rho\_center=(2+0.25 \times t) \times phi^{-1.6}$, a lower limit is $rho\_center-(0.052 \times (phi/30)^{-2})$, and an upper limit is $rho\_center+(0.795 \times (phi/30)^{-2})$.

The structure of the soundproofing structure of the present invention will be described with reference to FIGS. 1 and 2.

Figure 1:
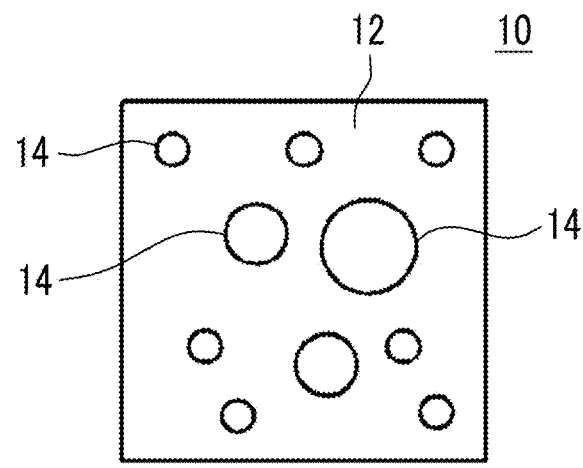
FIG. 1 is a front view schematically illustrating an example of a soundproofing structure of the present invention.

FIG. 1 is a front view schematically illustrating a preferred embodiment of a soundproofing structure of the present invention. FIG. 2 is a cross-sectional view of FIG. 1.

Figure 2:
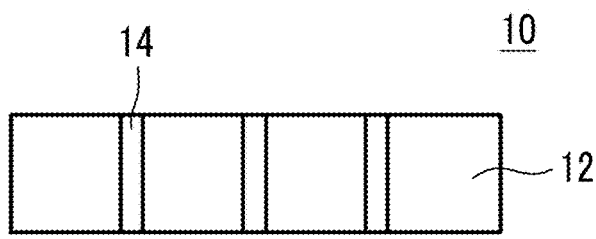
FIG. 2 is a cross-sectional view illustrating the soundproofing structure of FIG. 1.

As illustrated in FIGS. 1 and 2, a soundproofing structure 10 is obtained by forming a plurality of through-holes 14 passing therethrough in a thickness direction in a plate-like member 12.

Such a soundproofing structure 10 is used for a copying machine, a blower, an air conditioning machine, a ventilator, pumps, a generator, a duct, industrial equipment, for example, various kinds of manufacturing devices emitting a sound such as a coater, a rotating machine, and a carrier machine, transportation equipment such as an automobile, an electric train, and an aircraft, and general household equipment such as a refrigerator, a washing machine, a dryer, a television, a copier, a microwave, a game machine, an air conditioner, a fan, a personal computer, a vacuum cleaner, an air cleaner, and a ventilator. Further, the soundproofing structure 10 is appropriately disposed at a position through which a sound generated from a noise source passes in various devices.

Figure 3:
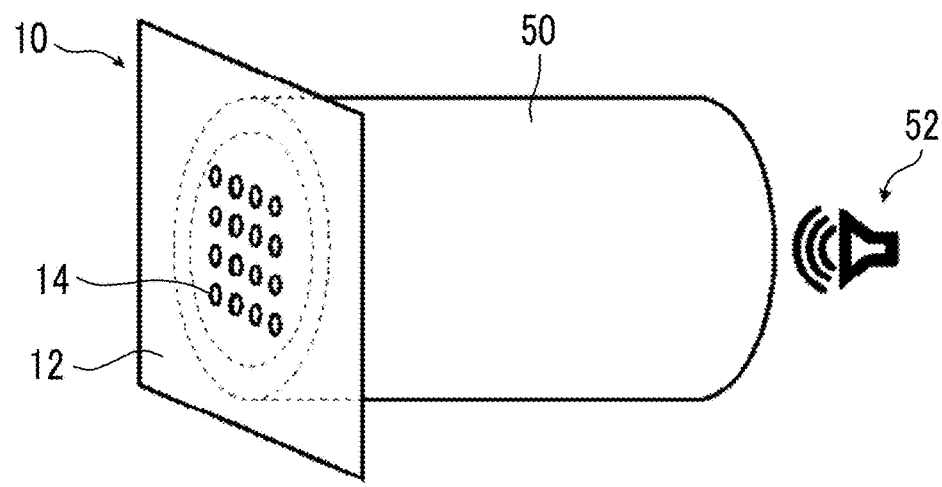
FIG. 3 is a perspective view schematically illustrating an example of a form of utilizing a soundproofing structure of the present invention.

For example, as illustrated in FIG. 3, the soundproofing structure 10 is disposed at an open end of a pipe 50 communicating with a noise source 52 and absorbs a sound generated from the noise source 52.

The average opening diameter of a plurality of through-holes 14 formed in a plate-like member 12 is 0.1 μm and less than 100 μm.

Here, the soundproofing structure 10 has a structure in which, in a case where the average opening diameter of the plurality of through-holes 14 is set as phi (μm) and the thickness of the plate-like member 12 is set as t (μm), the average opening ratio rho of the through-holes 14 is greater than 0 and less than 1 and falls in a range where the center is $rho\_center=(2+0.25 \times t) \times phi^{-1.6}$, the lower limit is $rho\_center-(0.052 \times (phi/30)^{-2})$, and the upper limit is $rho\_center+(0.795 \times (phi/30)^{-2})$.

As described below, the soundproofing structure of the present invention has fine through-holes whose average opening diameter is 0.1 μm or greater and less than 100 μm, at the above-described average opening ratio so that sound absorption occurs resulting from the friction between the air and the inner wall surface of each through-hole at the time of the sound passing through the fine through-holes. In other words, even in a case where a closed space is present, the volume of the closed space is different from the volume optimum for the Helmholtz resonance of the related art, and sound is absorbed according to a mechanism which is not resonant with the closed space. In this manner, the soundproofing structure 10 does not use the principle of the Helmholtz resonance in which the connection between an air layer inside a through-hole and an air layer inside a closed space is allowed to function as a mass spring to cause resonance for sound absorption.

As described above, in the configuration which is obtained by providing a closed space on one surface side (hereinafter, also referred to as the rear surface) of the plate-like member in which a plurality of through-holes have been formed and in which a sound is absorbed using the Helmholtz resonance, a shielding plate that does not allow a sound to pass through the rear surface of the plate-like member becomes indispensable in order to prepare a closed space. Further, as a principle, a frequency band which is capable of sound absorption since the resonance is used is narrow, and the band is difficult to widen.

In order to solve such a problem, it has been attempted to provide a plurality of holes in the thickness direction or the horizontal direction or provide a plurality of holes in the closed space on the rear surface, but there are problems of an increase in size of the holes because a plurality of cells need to be provided, complication of the structures or components because these need to be formed separately, and an increase in number of components.

Further, since a closed space is required to be provided on the rear side, there are problems in that the size of the volume of the closed space is increased and the ventilation properties or waste heat cannot be ensured.

In a soundproofing structure having through-holes without a closed space, a structure with the performance as close to the sound insulation performance of the original sheet as possible is ensured even in a case where the through-holes are opened by devising the structures around the through-holes has been suggested, but there are problems in that higher soundproofing performance cannot be obtained and a sound cannot be satisfactorily absorbed because the sound is reflected.

The present inventors found that the sound absorbing effect can be obtained without resonance with a closed space on a rear surface by providing a soundproofing structure including a plate-like member which has a plurality of through-holes passing therethrough in a thickness direction, in which an average opening diameter of the through-holes is 0.1 μm or greater and less than 100 μm, and in a case where the average opening diameter of the plurality of through-holes 14 is set as phi (μm) and a thickness of the plate-like member 12 is set as t (μm), an average opening ratio rho of the through-holes 14 is greater than 0 and less than 1 and falls in a range where a center is rho_center= $(2+0.25 \times t) \times phi^{-1.6}$, a lower limit is rho_center$-(0.052 \times (phi/30)^{-2})$, and an upper limit is rho_center$+(0.795 \times (phi/30)^{-2})$.

The present inventors speculated that the mechanism for the sound absorption of the soundproofing structure of the present invention is a change from the sound energy to the thermal energy due to the friction between the air and the inner wall surface of each through-hole at the time of the sound passing through the fine through-holes. Since this mechanism is operated in a case where the size of the through-holes is small, this mechanism is different from the mechanism of sound absorption using the resonance. A path of each through-hole through which the sound in the air directly passes has an extremely small impedance compared to a path that is radiated as a sound again after being converted into membrane vibration. Therefore, the sound easily passes through the path of through-holes finer than the membrane vibration. At the time of passing through these through-holes, the sound passes therethrough after being concentrated on a narrow area of the through-holes from a wide area on the entire plate-like member. Since the sound is collected in the through-holes, the local speed becomes extremely high. The friction inside the fine through-holes is increased and converted into heat in order to correlate with the speed.

In a case where the average opening diameter of the through-holes is small, it is considered that the friction occurring on the inner wall surface or an edge portion of each through-hole can be increased because the ratio of the length of the edge of the through-hole to the opening area is increased. By increasing the friction at the time of the sound passing through the through-holes, the sound energy is converted into the thermal energy so that the sound can be absorbed.

According to the examination of the present inventors, it was found that an optimum ratio for the average opening ratio of the through-holes is present and the absorbance is increased as the average opening ratio is decreased particularly in a case where the average opening diameter is approximately 50 µm or greater, which is relatively large. While the sound passes through each of the plurality of through-holes in a case where the average opening ratio is large, the amount of the sound passing through one through-hole becomes large since the number of through-holes is reduced in a case where the average opening ratio is small, the local speed of the air at the time of passing through the through-holes is further increased, and thus the friction occurring on the inner wall surface or an edge portion of each through-hole can be increased.

As described above, the soundproofing structure of the present invention does not need a closed space on the rear surface and can function only with the plate-like member having through-holes. Therefore, the size of the structure can be reduced.

Further, as described above, in the soundproofing structure of the present invention, since sound absorption occurs using the friction at the time of the sound passing through the through-holes, the sound can be absorbed in a broadband regardless of the frequency band of the sound.

Further, since a closed space is not provided on the rear surface, the ventilation properties can be ensured.

Further, since the through-holes are present, light can be transmitted while being scattered.

Further, since the soundproofing structure can function by forming fine through-holes, the degree of freedom for selecting the material is high and the material can be selected according to the environment by considering problems of the contamination of the surrounding environment and the performance of environmental resistance. Therefore, the problems can be reduced.

In addition, even in a case where a liquid such as water adheres to the plate-like member, water avoids the through-hole portions due to the surface tension so that the through-holes are not blocked because the plate-like member has fine through-holes, the sound absorption performance is unlikely to be degraded.

Further, since the plate-like member is a thin plate-like (film-like) member, the plate-like member can be bent according to the location where the plate-like member is disposed.

The mechanism for sound absorption of the present invention does not need a closed space on the rear side of the plate-like member. In other words, the soundproofing structure functions only with the plate-like member, and thus a closed space structure on the rear surface used for the purpose of sound absorption using a resonance phenomenon integrated with the soundproofing structure does not need to be provided.

However, the same function can be obtained even in a case where a closed space such as a room wall with respect to a window is provided on a rear side of the plate-like member. In the present application, a surface of the plate-like member on a sound incidence side is set as the front surface, a surface of the plate-like member on a side opposite to the front surface is set as the rear surface, and a space of the plate-like member on a rear surface side is set as a rear space.

In this case, flat characteristics are obtained in a case where the plate-like member is separated to the extent that the Helmholtz resonance fails. Specifically, in an environment of room temperature at a normal pressure, the plate-like member is required to be separated by a distance of 3.4 mm (100000 Hz) or longer, preferably 17 mm (20000 Hz, the upper limit of the audible range) mm or longer, more preferably 34 mm (10000 Hz) or longer, and most preferably 85 mm (4000 Hz) or longer. Further, preferable characteristics are obtained even in a case where a closed space is not provided on the rear side of the plate-like member.

Further, related to the "sound incident direction", in a case a clear noise source such as a speaker or a machine, the direction of the source can be determined as the incident direction. As a technique for quantitatively determining the "sound incident direction", the direction of a sound source can be determined by measuring phase information of a sound pressure and the particle speed simultaneously with amplitude information using a microphone array, beam forming, or a PU probe.

The intensity of the sound pressure and the position can be determined by using a three-dimensional intensity probe MI-6420 (manufactured by ONO SOKKI Co., Ltd.), a PU probe (sound pressure-particle speed probe) (manufactured by Microflown Technologies), or a microphone array system (manufactured by Bruel & Kjaer). It is desirable that a noise source for each frequency is determined from the entire space using a microphone array system in a case of a wide free space with a sufficient space, and a noise source can be determined using a small intensity probe or a PU probe in a case where the space is limited, for example, the inside of a duct.

From the viewpoint of the sound absorption performance, the upper limit of the average opening diameter of the through-holes is less than 100 µm, preferably 80 µm or less, more preferably 70 µm or less, still more preferably 50 µm or less, and most preferably 30 µm or less. The reason for this is that the friction is likely to occur because the ratio of the length of the edge of through-holes contributing to the friction among the through-holes to the opening area of the through-holes is increased as the average opening diameter of the through-holes is decreased.

The lower limit of the average opening diameter is preferably 0.5 µm or greater, more preferably 1 µm or greater, and still more preferably 2 µm or greater. In a case where the average opening diameter is extremely small, the viscous resistance is extremely high at the time of the sound passing through the through-holes, and thus the sound cannot sufficiently pass through the through-holes. Therefore, the sound absorbing effect cannot be sufficiently obtained even in a case where the opening ratio is increased.

As described above, in a case where the average opening diameter of the through-holes is set as phi (µm) and a thickness of the plate-like member is set as t (µm), the average opening ratio rho of the through-holes is greater than 0 and less than 1 and falls in a range where a center is rho_center=$(2+0.25 \times t) \times phi^{-1.6}$, a lower limit is rho_center−$(0.052 \times (phi/30)^{-2})$, and an upper limit is rho_center+$(0.795 \times (phi/30)^{-2})$.

Further, the average opening ratio rho is preferably in a range of rho_center−$0.050 \times (phi/30)^{-2}$ to rho_center+$0.505 \times (phi/30)^{-2}$, more preferably in a range of rho_center−$0.048 \times (phi/30)^{-2}$ to rho_center+$0.345 \times (phi/30)^{-2}$, still more preferably in a range of rho_center−$0.085 \times (phi/20)^{-2}$ to rho_center+$0.35 \times (phi/20)^{-2}$, particularly preferably in a range of rho_center−$0.24 \times (phi/10)^{-2}$ to rho_center+$0.57 \times (phi/10)^{-2}$, and most preferably in a range of (rho_center−$0.185 \times (phi/10)^{-2}$) to (rho_center+$0.34 \times (phi/10)^{-2}$). This point will be described in detail based on the following simulation.

The average opening diameter of the through-holes is obtained by imaging one surface of the plate-like member at a magnification of 200 times using a high-resolution scanning electron microscope (SEM) from one surface of the plate-like member, twenty through-holes whose surroundings are connected in a ring shape are extracted from the obtained SEM photograph, the opening diameters are read, and an average value of these obtained values is calculated as an average opening diameter. In a case where the number of through-holes is less than 20 in one SEM photo, other surrounding positions are imaged to obtain other SEM photos until the number of through-holes becomes 20.

Further, after the areas of the through-hole portions are respectively measured, the through-holes are replaced with circles having the same areas as those of the through-holes, and the opening diameter is evaluated using the diameter (circle equivalent diameter) of a circle at the time of replacement. In other words, since the shape of the opening portion of a through-hole is not limited to a substantially circular shape, in a case where the shape of the opening portion is a non-circular shape, the opening diameter is evaluated with the diameter of a circle having the same area as the through-hole. Therefore, in a case of through-holes having a shape in which two or more through-holes are integrated, these through-holes are regarded as one through-hole and the circle equivalent diameter of the through-holes is set as the opening diameter.

Through this process, all the circle equivalent diameter, the opening ratio, and the like can be calculated by "Analyze Particles" using, for example, "Image J" (https://imagej.nih.gov/ij/).

Further, the average opening ratio is obtained by imaging the surface of the plate-like member from directly above at a magnification of 200 times using a high-resolution scanning electron microscope (SEM), binarizing the visual fields (five sites) having a size of 30 mm×30 mm of the obtained SEM photo using image analysis software or the like to observe through-hole portions and non-through-hole portions, calculating the ratio (opening area/geometric area) from the total opening area of the through-holes and the area (geometric area) of the visual fields, and setting the average value in each visual field (5 sites) as an average opening ratio.

Here, in the soundproofing structure of the present invention, a plurality of through-holes may be regularly arranged or randomly arranged. From the viewpoints of the productivity of fine through-holes, robustness of sound absorption characteristics, and suppression of sound diffraction, it is preferable that the through-holes are randomly arranged. In regard to sound diffraction, a sound diffraction phenomenon occurs according to the cycle of through-holes in a case where the through-holes are periodically arranged, and there is a concern that the sound is bent due to the diffraction and the direction in which the noise advances is divided into a plurality of directions. The random arrangement indicates arrangement which does not have periodicity such as perfect alignment and in which the sound absorbing effect from each through-hole is exhibited and the diffraction phenomenon due to a minimum distance between through-holes does not occur.

Further, samples are also prepared by performing an etching treatment during a continuous treatment in a roll shape in the examples of the present invention. However, since mass production can be more easily made by performing a surface treatment or the like to form a random pattern at once rather than the process of preparing a periodic arrangement, it is preferable that the through-holes are randomly arranged from the viewpoint of the productivity.

In the present invention, random arrangement of through-holes is defined as follows.

Strongly diffracted light appears in a case of a perfectly periodic structure. Further, even in a case where only a small part of the periodic structure has a different position, diffracted light appears due to the remaining structure. Since diffracted light is a wave formed by superimposing scattered light from basic cells of the periodic structure, the mechanism for diffracted light is that the diffracted light is generated by interference of the remaining structure even in a case where only some basic cells are disturbed.

Therefore, as the number of basic cells disturbed from the periodic structure is increased, the intensity of the scattered light that interferes such that the diffracted light intensifies each other is decreased, and thus the intensity of diffracted light is decreased.

In the present invention, the term "random" indicates a state in which at least 10% of through-holes from among all through-holes are deviated from the periodic structure. Based on the description above, since it is desirable that the number of basic cells deviated from the periodic structure is increased in order to suppress diffracted light, a structure in which 50% of through-holes from among all through-holes are deviated is preferable, a structure in which 80% of through-holes from among all through-holes are deviated is more preferable, and a structure in which 90% of through-holes from among all through-holes are deviated is still more preferable.

As a verification of the deviation, it is possible to perform analysis on an image having 5 or more through-holes. As the number of through-holes is increased, the analysis can be performed with higher precision. An image in which the positions of a plurality of through-holes can be recognized using an optical microscope, an SEM, or the like can be used.

In a captured image, by focusing on one through-hole, the distances of the through-hole and other through-holes around the through-hole are measured. The nearest distance is set as a1, the second nearest distance is set as a2, the third nearest distance is set as a3, and the fourth nearest distance is set as a4. At this time, in a case where two or more distances from among a1 to a4 match to one another (for example, the matched distance is set as b1), the through-holes can be determined as holes having a periodic structure with respect to the distance b1. Meanwhile, in a case where any distances from among a1 to a4 do not match to each other, the through-holes can be determined as through-holes deviated from the periodic structure. This operation is performed on all through-holes on an image for determination.

Here, in a case where the hole diameter of the focused through-hole is set as Φ, up to the deviation by Φ is set to be included in the range of the above-described "match". In other words, in a relationship of "a2−Φ<a1<a2+Φ", a2 and a1 are set to match to each other. This is because scattering is considered to occur in a range of the hole diameter Φ because scattered light from each through-hole is considered as diffracted light.

Next, for example, the number of "through-holes having a periodic structure with respect to the distance b1" is counted and the ratio of the number of the through-holes to the number of all through-holes on an image is acquired. In a case where the ratio is set as c1, the ratio c1 is a ratio of the through-holes having a periodic structure, and 1-c1 is a ratio of the through-holes deviated from the periodic structure, and 1-c1 is a numerical value determining the above-described "random". In a case where a plurality of distances, for example, "through-holes having a periodic structure with respect to the distance b1" and "through-holes having a periodic structure with respect to a distance b2" are present, b1 and b2 are separately counted. In a case where the ratio of the periodic structure with respect to the distance b1 is set as c1 and the ratio of the periodic structure with respect to the distance b2 is set as c2 and in a case where both of (1-c1) and (1-c2) satisfy 10% or greater, the structures thereof are determined as "random" structures.

Further, in a case where any of (1-c1) or (1-c2) is less than 10%, the structure has a periodic structure and is not "random". In this manner, in a case where the condition for being "random" is satisfied with respect to any of the ratios c1, c2, . . . , the structure thereof is defined as "random".

Further, a plurality of through-holes may be formed of through-holes having one opening diameter or formed of through-holes having two or more opening diameters. From the viewpoints of the productivity and the durability, it is preferable that the plurality of through-holes are formed of through-holes having two or more opening diameters.

In terms of the productivity, similar to the random arrangement, the productivity is improved in a case where the hole diameter is allowed to vary from the viewpoint of performing a large number of etching treatments. From the viewpoint of the durability, since the size of dust or dirt varies depending on the environment, in a case where the through-holes are formed of through-holes having one opening diameter and the size of main dirt approximately matches the size of each through-hole, all holes are affected by the dirt. Therefore, a device which can be used in various environments can be obtained by providing through-holes with a plurality of different opening diameters.

According to the production method of WO2016/060037A or the like, it is possible to form a through-hole in which the hole diameter is increased and which has a maximum diameter therein. Due to this shape, dirt (dust, a toner, non-woven fabric, or a foam which becomes separated) having an approximately same size as that of a through-hole is unlikely to be clogged inside of the through-hole and the durability of the film having the through-hole is improved.

Dirt having a larger diameter than the diameter of the outermost surface of a through-hole cannot enter the inside of the through-hole, and dirt having a smaller diameter than the diameter thereof can pass through the through-hole since the diameter of the inside of the through-hole is increased.

In consideration of the opposite shape in which the inside of a through-hole has a smaller diameter than the diameter of the surface thereof, dirt having passed through the outermost surface of the through-hole is clogged at a portion inside having a smaller diameter, and thus the dirt is likely to remain therein. Compared to this, it was found that the shape in which the inside has a maximum diameter functions advantageously from the viewpoint of suppressing clogging of dirt.

Further, in a case of a so-called tapered shape, any one surface of a film has a maximum diameter and the inner diameter decreases substantially monotonically, in a case where dirt satisfying the relationship of "the maximum diameter>the size of dirt>the diameter of the other surface" enters from a side having a maximum diameter, the shape of the inside functions as a slope, and thus the possibility of the dirt being clogged therein becomes increased.

Figure 7:
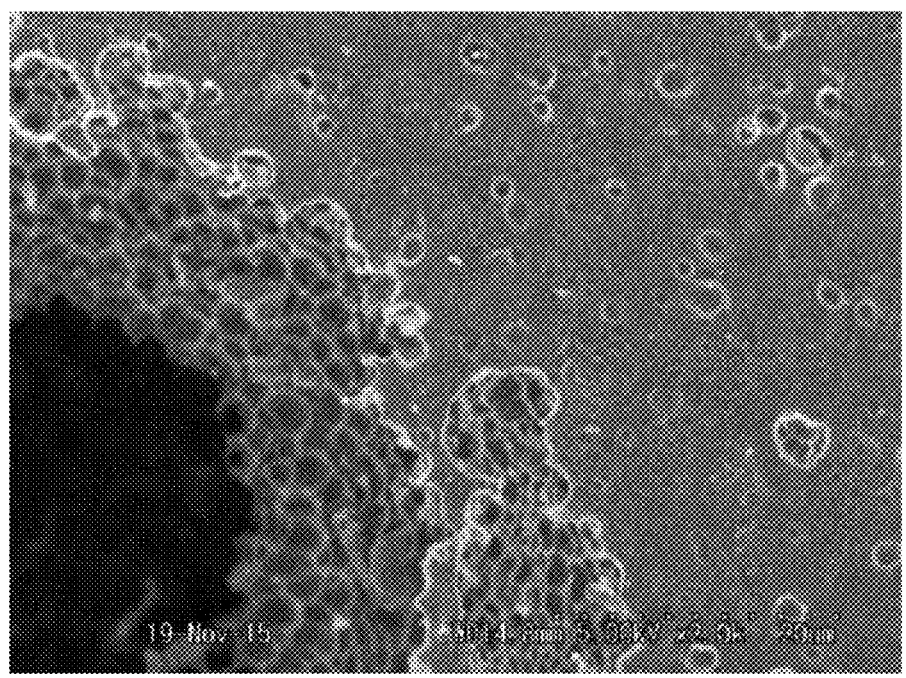
FIG. 7 is an image obtained by imaging an inner wall surface of a through-hole.

From the viewpoint of further increasing the friction at the time of the sound passing through the through-holes, it is preferable that the inner wall surface of a through-hole is roughened (see FIG. 7). Specifically, the surface roughness Ra of the inner wall surface of a through-hole is preferably 0.1 µm or greater, more preferably in a range of 0.1 µm to 10.0 µm, and still more preferably in a range of 0.2 µm to 1.0 µm.

Here, the surface roughness Ra can be obtained by measuring the inside of a through-hole using an atomic force microscope (AFM). As the AFM, for example, SPA300 (manufactured by High-Tech Science Corporation) can be used. The measurement can be performed using OMCL-AC200TS as a cantilever in a dynamic force mode (DFM). Since the surface roughness of the inner wall surface of a through-hole is approximately several microns, it is preferable to use an AFM from the viewpoints of the measurement range of several microns and the precision.

Further, FIG. 7 is an SEM photo obtained by imaging the sample of Example 1 described below.

Further, by regarding each projection of a depression in a through-hole from the SEM image showing the inside of a through-hole as a particle, the average particle diameter of projections can be calculated.

Specifically, an SEM image (a visual field having a size of approximately 1 mm×1 mm) captured at a magnification of 2000 times is taken in Image J, binarized into white and black so that the projections are shown as white to acquire the area of each projection using Analyze Particles. By assuming circles with the same areas as the areas of the projections to acquire the circle equivalent diameter of each projection, an average value of the obtained values is calculated as an average particle diameter.

For example, the particle diameters of Example 1 described below are distributed approximately in a range of 1 µm to 3 µm, and the average is approximately 2 µm. The average particle diameter of projections is preferably in a range of 0.1 μm to 10.0 μm and more preferably in a range of 0.15 μm to 5.0 μm.

In the simulation results described below, the speed inside a through-hole is measured after calculation through the simulation desired to correspond to Example 1. The speed inside a through-hole is $5\times10^{-2}$ (m/s) in a case where the sound pressure is 1 [Pa] (=94 dB) and the speed therein is $1\times10^{-3}$ (m/s) in a case where the sound pressure is 60 dB.

At the time of absorption of a sound at a frequency of 2500 Hz, the local moving speed of a medium that mediates sound waves is known based on the local speed. Based on this, the movement distance is acquired by assuming that particles of through-holes vibrate in the penetration direction. Since the sound vibrates, the distance amplitude thereof becomes the distance at which the sound can move within half a circle. At a frequency of 2500 Hz, since one cycle is $\frac{1}{2500}$ seconds, half the time can be the same direction. The maximum movement distance (acoustic movement distance) at the sound wave half cycle acquired from the local speed is 10 μm at 94 dB and 0.2 μm at 60 dB. Accordingly, since the friction increases in a case where the inner wall surface has the surface roughness to the extent of this acoustic movement distance, the above-described range of the surface roughness Ra and the above-described range of the average particle diameter of the projections are preferable.

Here, from the viewpoint of the visibility of through-holes, the average opening diameter of a plurality of through-holes forming the plate-like member is preferably 50 μm or less and more preferably 20 μm or less.

In a case where the plate-like member having fine through-holes used for the soundproofing structure of the present invention is disposed on a surface of a wall or a place which can be seen, the designability is degraded because the through-holes are seen and the appearance of holes makes people uneasy, and thus it is desirable that through-holes are not seen. It is a problem to see through-holes in various places such as a soundproofing wall inside a room, an articulation wall, a soundproofing panel, an articulation panel, and an exterior portion of a machine.

First, the visibility of one through-hole will be examined.

Hereinafter, a case where the resolving power of the human eye is a visual acuity 1 will be described.

Figure 29:
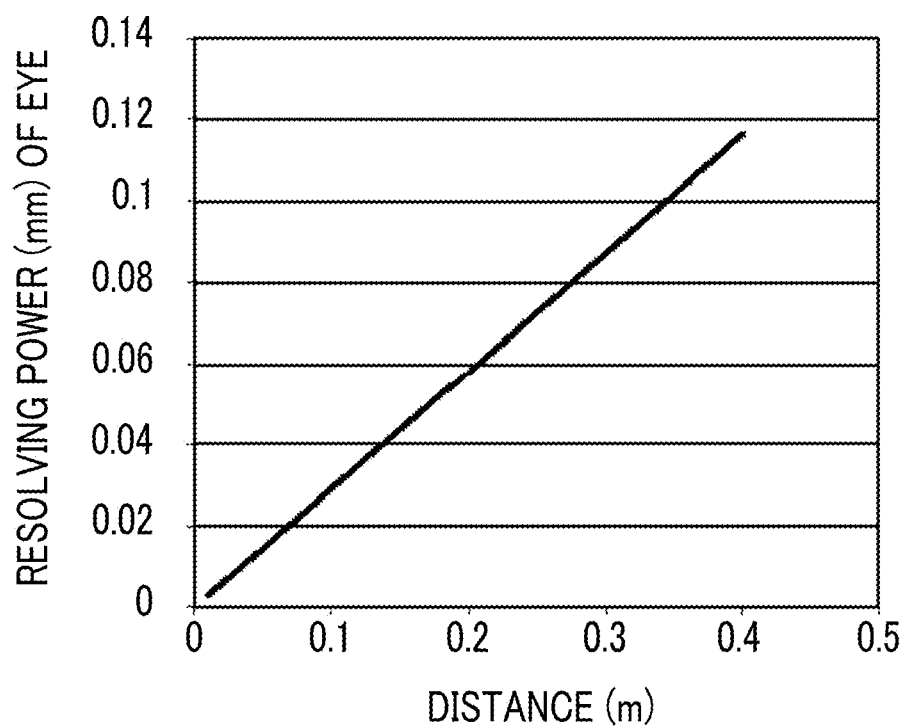
FIG. 29 is a graph showing the relationship between the distance and the resolving power of the eye.

The definition of the visual acuity 1 is that an object is seen by resolving 1 arc minute. This indicates that an opening diameter of 87 μm can be resolved at a distance of 30 cm. The relationship between the distance and the resolving power in a case of the visual acuity 1 is shown in FIG. 29.

Whether the through-holes are seen is strongly related to the above-described visual acuity. As in a case of the visual acuity test performed based on the recognition of a gap portion of the Landolt ring, whether a gap between two points and/or two lines is seen depends on the resolution. In other words, it is difficult to see a through-hole having an opening diameter less than the resolving power of the eye because the distance between edges of a through-hole cannot be resolved by the eye. Meanwhile, the shape of a through-hole having an opening diameter greater than or equal to the resolving power of the eye can be seen.

In a case of the visual acuity 1, a through-hole having an opening diameter of 100 μm can be resolved from a distance of 35 cm, but a through-hole having an opening diameter of 50 μm and a through-hole having an opening diameter of 20 μm cannot be resolved by the eye unless approaching a distance of 18 cm and a distance of 7 cm respectively. Accordingly, in a case of a through-hole having an opening diameter of 100 μm, the through-hole can be seen and made people feel uneasy. However, by using a through-hole having an opening diameter 20 μm, the through-hole cannot be seen unless approaching a ⅕ distance which is extremely close. Therefore, it is advantageous that the opening diameter becomes smaller from the viewpoint of the concealment of through-holes. The distance between a soundproofing structure and an observer is usually several tens of centimeters in a case where the soundproofing structure is used on a wall or in a car, the boundary of the opening diameter in this case is approximately 100 μm.

Next, light scattering occurring due to through-holes will be described. Since the wavelength of visible light is approximately in a range of 400 nm to 800 nm (0.4 μm to 0.8 μm), the opening diameter of several tens of micrometers described in the present invention is sufficiently larger than the optical wavelength. In this case, the scattering cross-sectional area (the amount indicating that how strongly an object is scattered, the unit is the area) in visible light substantially coincides with the geometric cross-sectional area, that is, the cross-sectional area of a through-hole in this case. In other words, the size of scattering of visible light is proportional to the square of the radius of a through-hole (half of the circle equivalent diameter). Accordingly, as the size of the through-hole becomes larger, the intensity of light scattering is increased by the square of the radius of the through-hole. Since the visibility of a single through-hole is proportional to the amount of light to be scattered, the visibility is increased in a case where each through-hole is large even in a case where the average opening ratio is the same.

Finally, a difference between a periodic arrangement and a random arrangement in which the arrangement of through-holes does not have periodicity will be examined. In the periodic arrangement, a light diffraction phenomenon occurs according to the cycle. In a case where white light to be transmitted, white light to be reflected, or light with a wide spectrum comes into contact with the arrangement, the light is seen to have different colors so that the pattern becomes conspicuous for various reasons, for example, the light is diffracted and is seen to have different colors like a rainbow, the light is strongly reflected at a specific angle, or the like. In the example described below, a plurality of through-holes are periodically formed with respect to nickel, but the spreading of colors due to diffracted light can be seen in a case where this nickel film is seen through using fluorescent light.

Meanwhile, the above-described diffraction phenomenon does not occur in a case where the through-holes are randomly arranged. It was confirmed that color change due to diffracted light is not seen in all aluminum films, prepared in the following example, in which fine through-holes have been formed, even in a case where the films are seen through using fluorescent light. Further, it was confirmed that the appearance has the same metallic gloss as typical aluminum foil even in a case of viewing the film by preparing the through-holes in a reflection arrangement and diffraction reflection does not occur.

In the example illustrated in FIG. 1, one plate-like member 12 in which a plurality of through-holes 14 have been formed is set as the soundproofing structure 10, but the present invention is not limited thereto, and a configuration in which two or more plate-like members in which a plurality of through-holes have been formed are arranged in the thickness direction may be employed. In other words, a soundproofing structure may be formed by arranging two or more of the soundproofing structures 10 of the present invention in the thickness direction.

Figure 4:
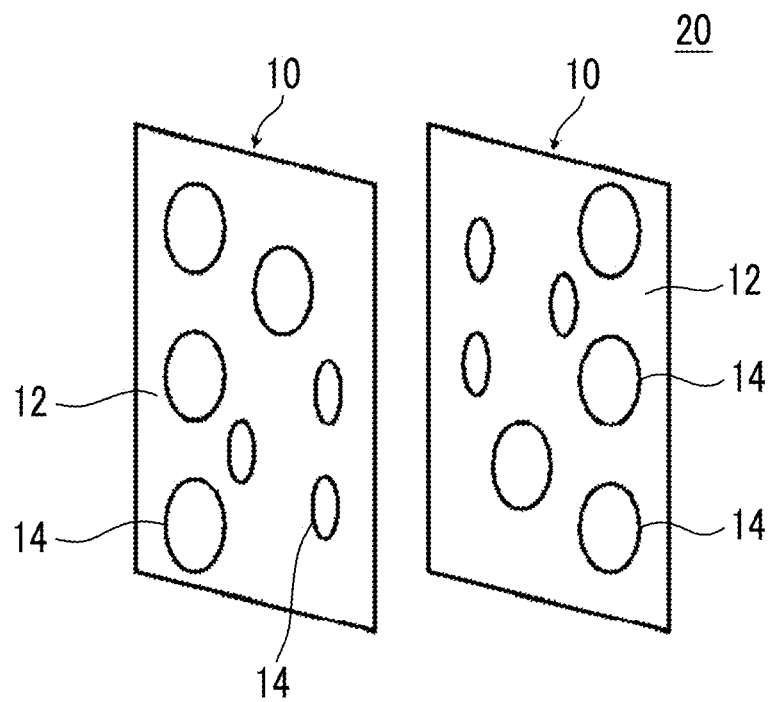
FIG. 4 is a perspective view schematically illustrating another example of a soundproofing structure of the present invention.

For example, a soundproofing structure 20 illustrated in FIG. 4 is formed by arranging two plate-like members 12 in which a plurality of through-holes 14 have been formed in the thickness direction.

In a case where two or more plate-like members 12 are arranged in the thickness direction, the plate-like members 12 may be in contact with each other or separated from each other.

In a case where the plate-like members 12 are disposed by being separated from each other, a spacer may be disposed at a position that does not interfere with the passage of a sound, between the plate-like members 12.

Here, as described above, the mechanism for sound absorption of the present invention is the conversion of sound energy into thermal energy using the friction at the time of the sound passing through the through-holes. Accordingly, as the local speed of the air at the time of passing through the through-holes becomes higher, the sound absorption performance is increased. Therefore, in a case of the configuration formed by arranging two or more plate-like members 12, it is preferable that the plate-like members 12 are disposed by being separated from each other. By arranging the plate-like members 12 being separated from each other, a decrease in local speed at the time of the sound passing through the through-holes 14 of the plate-like member 12 to be disposed at the rear stage can be suppressed due to the influence of the plate-like member 12 to be disposed at the front stage in the passing direction of the sound, and thus the sound can be more suitably absorbed.

Here, in a case where the distance between the plate-like members is increased, the size of the structure is increased and the distance between the plate-like members becomes about the wavelength. Due to this, sound interference occurs and thus the flat sound absorption characteristics are not exhibited any more. Accordingly, it is desirable that the distance is shorter than a length of 100 mm which is a wavelength of a sound at a frequency of 3400 Hz as a typical wavelength and more desirable that the distance is shorter than a length of 34 mm which is a wavelength of a sound at a frequency of 10000 Hz.

Meanwhile, in a case where the distance between the plate-like members is decreased, the sound absorption of the plate-like members at the rear stage is affected by the local speed lowered by the friction at the through-holes of the plate-like member at the front stage. Therefore, the efficiency is improved in a case where the plate-like members are appropriately separated from each other.

From the viewpoint of suitably suppressing a decrease in local speed at the time of the sound passing through the through-holes 14 of the plate-like member 12 at the rear stage, the distance between the plate-like members 12 is preferably in a range of 5 mm to 100 mm and more preferably in a range of 10 mm to 34 mm.

Further, although the thickness of the plate-like member is not limited, it is considered that the sound absorption performance is further improved due to an increase in friction energy at the time of the sound passing through the through-holes as the thickness of the plate-like member is larger. Further, in a case where the thickness of the plate-like member is extremely thin, since the plate is difficult to handle, it is preferable that the plate-like member is thick enough to be held. In addition, from the viewpoints of miniaturization, ventilation properties, and the light transmittance, it is preferable that the plate-like member is thin. In a case where etching or the like is used as the method of forming through-holes, since it takes time to prepare the plate-like member as the thickness thereof is increased, it is desirable that the plate-like member is thin from the viewpoint of productivity.

From the viewpoints of the sound absorption performance, the miniaturization, the ventilation properties, and the light transmittance, the thickness of the plate-like member is preferably in a range of 5 µm to 500 µm, more preferably in a range of 7 µm to 300 µm, and particularly preferably in a range of 10 µm to 100 µm.

The material of the plate-like member is not limited, and examples of the material which can be used include various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride, polyethylene, polyvinyl chloride, polymethylpentene, a cycloolefin polymer (COP), polycarbonate, ZEONOA, polyethylene naphthalate (PEN), polypropylene, and polyimide. Further, other examples thereof include glass materials such as thin film glass; and fiber reinforced plastic materials such as carbon fiber reinforced plastics (CFRP) and glass fiber reinforced plastics (GFRP).

From the viewpoint that the Young's modulus is high, vibration is unlikely to occur even in case where the thickness is small, and the effect of sound absorption using the friction at fine through-holes is easily obtained, it is preferable to use metallic materials. Among these, from the viewpoints of being lightweight, easily forming fine through-holes through etching or the like, availability, and the cost, it is preferable to use aluminum.

In a case where a metallic material is used, from the viewpoint of suppressing rust, metal plating may be applied to the surface.

Further, by applying metal plating to at least the inner surface of a through-hole, the diameter of the through-hole may be adjusted to be in a range smaller than the average opening diameter.

By using a material, which has a conductivity and is not charged, such as a metallic material as the material of the plate-like member, it is possible to suppress degradation of sound absorption performance due to clogging of dust, dirt, and the like in the through-holes of the plate-like member without attraction of fine dust, dirt, and the like to the film due to static electricity.

Further, the heat resistance can be increased by using a metallic material as the material of the plate-like member. In addition, ozone resistance can be increased.

Further, in a case where a metallic material is used as the material of the plate-like member, electric waves can be shielded.

By using a metallic material as the material of the plate-like member, the metallic material functions as a heat insulating material that prevents heat transfer due to radiant heat because the metallic material has a large reflectivity with respect to radiant heat due to far infrared rays. At this time, a plurality of through-holes are formed in the plate-like member, but the opening diameter of the through-holes is small. Therefore, the plate-like member functions as a reflective film.

It is known that a structure in which a plurality of fine through-holes are formed in a metal functions as a high pass filter of a frequency. For example, a window with metal mesh of a microwave oven has a property of blocking microwaves used for a microwave oven while passing high-frequency visible light therethrough. In a case where the hole diameter of a through-hole is set as $\Phi$ and the wavelength of an electromagnetic wave is set as $\lambda$, the window functions as a filter that does not allow a long wavelength component satisfying a relationship of "$\Phi<\lambda$" to pass through and allows a short wavelength component satisfying a relationship of "$\Phi>\lambda$" to pass through.

Here, the radiant heat is described. The radiant heat is a heat transfer mechanism in which far infrared rays are emitted from an object according to an object temperature and the emitted rays are transmitted to another object. According to the Wien's radiation law, it is known that the radiant heat in an environment at room temperature is distributed about $\lambda=10$ μm and contributes to effectively transferring heat through radiation up to a wavelength (up to 30 μm) three times the wavelength on the long wavelength side. In consideration of the relationship between the hole diameter $\Phi$ and the wavelength $\lambda$ of the high pass filter, a component satisfying a relationship of "$\lambda>20$ μm" is strongly shielded in a case of $\Phi=20$ μm. Further, in a case of $\Phi=50$ μm, the radiant heat propagates after passing through the through-holes because the relationship of "$\Phi>\lambda$" is satisfied. In other words, it is found that the propagation performance of radiant heat greatly varies depending on a difference in hole diameter $\Phi$ since the hole diameter $\Phi$ is several tens of micrometers, and the structure functions well as a radiant heat cut filter as the hole diameter $\Phi$, that is, the average opening diameter becomes smaller. Accordingly, from the viewpoint of functioning as a heat insulating material that prevents heat transfer due to radiant heat, the average opening diameter of the through-holes to be formed in the plate-like member is preferably 20 μm or less.

In a case where the entire soundproofing structure is required to have transparency, a resin material or a glass material that is capable of making the structure transparent can be used. For example, among resin materials, since a PET film has a relatively high Young's modulus, is available, and has high transparency, a suitable soundproofing structure can be obtained by forming through-holes using this material.

Further, the durability of the plate-like member can be improved by appropriately performing a surface treatment (such as a plating treatment, an oxide film treatment, or surface coating (fluorine or ceramic)) on the plate-like member according to the material thereof. For example, in a case where aluminum is used as the material of the plate-like member, an oxide film can be formed on the surface of the plate-like member by performing an alumite treatment (an anodic oxidation treatment) or a boehmite treatment thereon. The corrosion resistance, the abrasion resistance, and the scratch resistance can be improved by forming an oxide film on the surface thereof. Further, the color resulting from optical interference can be adjusted by adjusting the treatment time to adjust the thickness of the oxide film.

Further, the plate-like member can be colored, decorated, and designed. As methods of performing these, methods may be appropriately selected depending on the material of the plate-like member or the state of the surface treatment. For example, printing or the like according to an ink jet method can be used. Further, in a case where aluminum is used as the material of the plate-like member, coloring with high durability can be performed by carrying out a color alumite treatment. The color alumite treatment is a treatment of performing an alumite treatment on the surface, permeating a dye thereinto, and performing a sealing treatment on the surface. In this manner, a plate-like member with high designability in which the presence of metallic gloss or the color can be designed can be obtained. Further, by performing the alumite treatment after the through-holes are formed, an anodic oxide film is formed only on the aluminum portion, a dye covers the through-holes so that decoration can be performed without degrading the sound absorption characteristics.

The plate-like member can be colored and designed in various manners by matching the alumite treatment.

<Aluminum Substrate>

An aluminum substrate used as a plate-like member is not particularly limited, and known aluminum substrates with alloy No. 1085, 1N30, 3003, and the like described in JIS Standard H 4000 can be used. Further, an aluminum substrate is an alloy plate containing aluminum as a main component and containing a trace amount of foreign elements.

The thickness of the aluminum substrate is not particularly limited, but is preferably in a range of 5 μm to 1000 μm, more preferably in a range of 7 μm to 200 μm, and particularly preferably in a range of 10 μm to 100 μm.

Hereinafter, the physical properties or characteristics of a structural member which can combine with a soundproofing member having the soundproofing structure of the present invention will be described.

[Flame Retardancy]

In a case where a soundproofing member having the soundproofing structure of the present invention is used as a building material or a soundproofing material in equipment, flame retardancy is required.

Accordingly, it is preferable that the plate-like member is flame retardant. In a case where a resin is used as the plate-like member, for example, LUMIRROR (registered trademark) non-halogen flame retardant type ZV series (manufactured by Toray Industries, Inc.) which is a flame retardant PET film, TEIJIN TETORON (registered trademark) UF (manufactured by Teijin Limited), and/or DIALAMY (registered trademark) (manufactured by Mitsubishi Plastics, Inc.) may be used.

Further, by using metallic materials such as aluminum, nickel, tungsten, and copper, flame retardancy can be imparted.

[Heat Resistance]

Since there is a concern that the soundproofing characteristics resulting from expansion and contraction of the structural member of the soundproofing structure of the present invention may change due to the environmental temperature change, it is preferable that the material constituting the structural member is heat-resistant and low heat shrinkable.

In a case where a resin is used as the plate-like member, TEIJIN TETORON (registered trademark) SLA (manufactured by Teijin Limited), a TEONEX (registered trademark) (manufactured by Teijin DuPont Films Co., Ltd.) PEN film, and/or a LUMIRROR (registered trademark) off annealing low contraction type (manufactured by Toray Industries, Inc.) film is preferably used. Further, it is also preferable to use a metal film such as an aluminum film typically having a smaller thermal expansion coefficient than that of a plastic material.

[Weather Resistance and Light Resistance]

In a case where a soundproofing member having the soundproofing structure of the present invention is disposed in outdoors or in a place where light comes in, the weather resistance of the structural member becomes problematic.

In a case where a resin is used as the plate-like member, it is preferable to use a weather resistant film such as a special polyolefin film (ART PLY (registered trademark) (manufactured by Mitsubishi Plastics, Inc.), an acrylic resin film (ACRYPRENE (manufactured by MITSUBISHI RAYON CO., LTD.)), and/or a Scotchcal (registered trademark) film (manufactured by 3M Company).

Further, the light resistance with respect to ultraviolet rays can be imparted using a metallic material such as aluminum.

In regard to the moisture resistance, it is preferable to select an appropriate plate-like member having a high moisture resistance. Further, related to water-absorbing properties and chemical resistance, it is preferable to select an appropriate plate-like member.

[Dirt]

In the use for a long period of time, there is a possibility that dirt adheres to the surface of the plate-like member and affects the soundproofing characteristics of the soundproofing structure of the present invention. Therefore, it is preferable to prevent adhesion of dirt or remove adhered dirt.

As a method of preventing dirt, it is preferable to use a plate-like member formed of a material to which dirt is unlikely to adhere. For example, by using a conductive film (FLECLEAR (registered trademark) (manufactured by TDK Corporation) and/or NCF (manufactured by NAGAOKA SANGYOU CO., LTD.)), the plate-like member is not charged, and thus adhesion of dirt due to the plate-like member being charged can be prevented. Further, adhesion of dirt due to static electricity can be prevented by selecting a plate-like member having conductivity, for example, a metallic material such as aluminum.

In addition, adhesion of dirt can be suppressed even by using a fluorine resin film (DINOC film (registered trademark) (manufactured by 3M Company) and/or a hydrophilic film (Miraclean (manufactured by Lifeguard)), RIVEX (manufactured by RIKEN TECHNOS CORPORATION), and/or SH2CLHF (manufactured by 3M Company)). Further, contamination of the plate-like member can be prevented by using a photocatalyst film (Laclean (manufactured by KIMOTO CO., LTD.)). The same effects can be obtained by applying a spray having conductivity, hydrophilicity, and/or photocatalystic properties and/or a spray having a fluorine compound to the plate-like member.

Further, by forming a hydrophilic surface including the inside of holes through silica coating, forming a hydrophobic surface through fluorine coating, or using these at the same time, antifouling coating that allows hydrophilic stain or hydrophobic stain to be easily peeled off can be performed.

In addition to the use of the above-described special materials, stain can be prevented by proving a cover on the plate-like member. As the cover, a thin film material (Saran Wrap (registered trademark)), a mesh (formed of a metal, plastic, or the like) having a network with a size that does not allow dirt to pass through, non-woven fabric, urethane, aerogel, or a porous film can be used.

Figure 28:
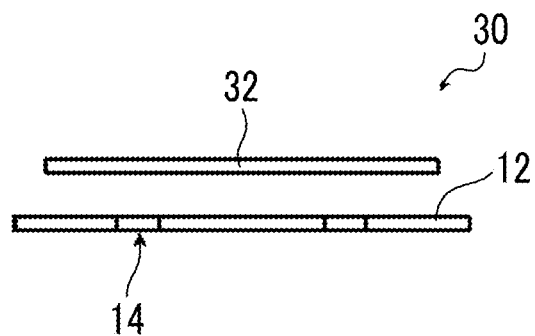
FIG. 28 is a schematic cross-sectional view illustrating an example of a soundproofing member having a soundproofing structure of the present invention.

For example, it is possible to prevent wind or dirt from being directly applied to the plate-like member 12 by disposing a cover 32 on the plate-like member 12 in a state in which the plate-like member 12 and the cover 32 are separated by a predetermined distance as in a soundproofing member 30 illustrated in FIG. 28.

In a case where a particularly thin film material or the like is used as a cover, it is preferable that the cover is separated from the plate-like member 12 of the present invention by a distance therebetween without directly being attached thereto, from the viewpoint of not disturbing the effects of the through-holes of the present invention. Since a thin film material does not show strong membrane vibration and passes through a sound, membrane vibration is likely to occur in a case where the thin film material is attached and fixed to the plate-like member. Therefore, it is desirable that the thin film material is in a state of being loosely supported.

As a method of removing adhered dirt, dirt can be removed by emitting a sound to the plate-like member and stringing vibrating the plate-like member. Further, the same effect can be obtained in a case of using a blower or wiping.

[Wind Pressure]

In a case where strong wind is applied to the plate-like member, since the plate-like member is in a state of being pressured, the resonance frequency may be changed. Therefore, the influence of wind can be suppressed by covering the plate-like member with non-woven fabric, urethane, and/or a film.

[Method of Producing Soundproofing Structure]

Next, an example of using an aluminum substrate will be described as a method of producing the soundproofing structure of the present invention.

The method of producing the soundproofing structure using an aluminum substrate includes a film forming step of forming a film containing aluminum hydroxide as a main component on the surface of the aluminum substrate; a through-hole forming step of performing a through-hole forming treatment after the film forming step to form through-holes; and a film removing step of removing the aluminum hydroxide film after the through-hole forming step.

In a case where the method includes the film forming step, the through-hole forming step, and the film removing step, through-holes having an average opening diameter of 0.1 µm or greater and less than 100 µm can be suitably formed.

Next, after description of each step according to the method of producing the soundproofing structure with reference to FIGS. 5A to 5E, each step will be described in detail.

FIGS. 5A to 5E are cross-sectional views illustrating an example of a suitable embodiment for the method of producing the soundproofing structure using an aluminum substrate.

Figure 5A:
FIG. 5A is a schematic cross-sectional view for describing an example of a suitable method of producing an aluminum plate of the present invention.
Figure 5B:
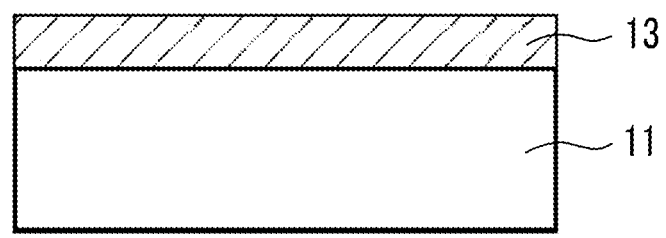
FIG. 5B is a schematic cross-sectional view for describing an example of a suitable method of producing an aluminum plate of the present invention.
Figure 5C:
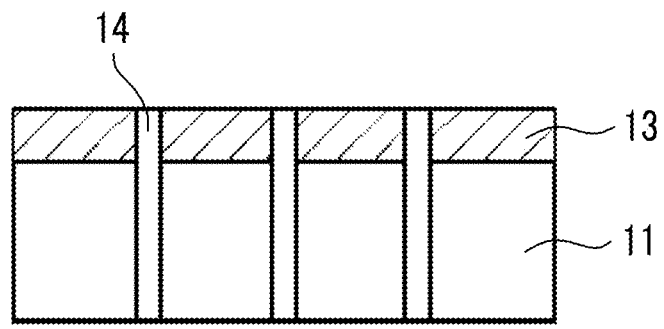
FIG. 5C is a schematic cross-sectional view for describing an example of a suitable method of producing an aluminum plate of the present invention.
Figure 5D:
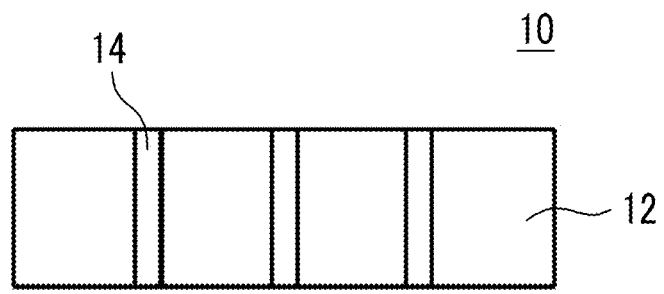
FIG. 5D is a schematic cross-sectional view for describing an example of a suitable method of producing an aluminum plate of the present invention.

As illustrated in FIGS. 5A to 5E, the method of producing the soundproofing structure is a production method including a film forming step of performing a film forming treatment on one principal surface of an aluminum substrate 11 to form an aluminum hydroxide film 13 (FIGS. 5A and 5B); a through-hole forming step of performing an electrodissolution treatment after the film forming step to form through-holes 14 and forming through-holes in the aluminum substrate 11 and the aluminum hydroxide film 13 (FIGS. 5B and 5C), and a film removing step of removing an aluminum hydroxide film 13 after the through-hole forming step to prepare a soundproofing structure formed of the plate-like member 12 having the through-holes 14 (FIGS. 5C and 5D).

Figure 5E:
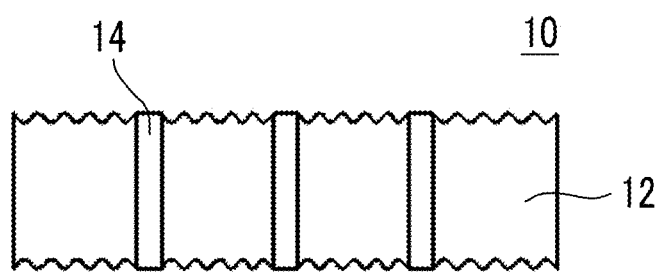
FIG. 5E is a schematic cross-sectional view for describing an example of a suitable method of producing an aluminum plate of the present invention.

In addition, it is preferable that the method of producing the soundproofing structure includes a roughening treatment step of performing an electrochemical roughening treatment on the plate-like member 12 having the through-holes 14 after the film removing step so that the surface of the plate-like member 12 is roughened (FIGS. 5D and 5E).

Since small holes are likely to be formed in an aluminum hydroxide film, through-holes having an average opening diameter of 0.1 µm or greater and less than 100 µm can be formed by performing an electrodissolution treatment in the through-hole forming step to form through-holes after the film forming step of forming an aluminum hydroxide film.

[Film Forming Step]

In the present invention, the film forming step included in the method of producing a plate-like member is a step of performing a film forming treatment on the surface of the aluminum substrate to form an aluminum hydroxide film.

<Film Forming Treatment>

The film forming treatment is not particularly limited, and the same treatment as a known treatment of forming an aluminum hydroxide film of the related art can be performed.

As the film forming treatment, the conditions or devices described in paragraphs <0013> to <0026> of JP2011-201123A can be appropriately employed.

In the present invention, the conditions for the film forming treatment greatly vary depending on the electrolytic solution to be used and cannot be unconditionally determined. However, as the suitable conditions, typically, the concentration of the electrolytic solution is in a range of 1% to 80% by mass, the liquid temperature is in a range of 5° C. to 70° C., the current density is in a range of 0.5 to 60 A/dm$^2$, the voltage is in range of 1 to 100 V, and the electrolysis time is in a range of 1 second to 20 minutes, and the conditions are adjusted to obtain a desired amount of a film.

In the present invention, it is preferable that an electrochemical treatment is performed using nitric acid, hydrochloric acid, sulfuric acid, phosphoric acid, oxalic acid, or mixed acids of two or more of these acids as an electrolytic solution.

In a case where the electrochemical treatment is performed in an electrolytic solution containing nitric acid and hydrochloric acid, direct current or alternating current may be applied to a space between the aluminum substrate and a counter electrode. In a case where direct current is applied to the aluminum substrate, the current density is preferably in a range of 1 to 60 A/dm$^2$ and more preferably in a range of 5 to 50 A/dm$^2$. In a case where the electrochemical treatment is continuously performed, it is preferable that the treatment is performed according to a liquid supply system that supplies power to the aluminum substrate through an electrolytic solution.

In the present invention, the amount of the aluminum hydroxide film to be formed by the film forming treatment is preferably in a range of 0.05 to 50 g/m$^2$ and more preferably in a range of 0.1 to 10 g/m$^2$.

[Through-Hole Forming Step]

The through-hole forming step is a step of performing an electrodissolution treatment after the film forming step to form through-holes.

<Electrodissolution Treatment>

The electrodissolution treatment is not particularly limited, and an acidic solution is used as an electrolytic solution using direct current or alternating current. Among the above-described acids, it is preferable to perform the electrochemical treatment using at least one of nitric acid or hydrochloric acid and more preferable to perform the electrochemical treatment using mixed acids of at least one of sulfuric acid, phosphoric acid, or oxalic acid in addition to these acids.

In the present invention, as the acidic solution serving as an electrolytic solution, electrolytic solutions described in each specification of U.S. Pat. No. 4,671,859, U.S. Pat. No. 4,661,219, U.S. Pat. No. 4,618,405, U.S. Pat. No. 4,600,482, U.S. Pat. No. 4,566,960, U.S. Pat. No. 4,566,958, U.S. Pat. No. 4,566,959, U.S. Pat. No. 4,416,972, U.S. Pat. No. 4,374,710, U.S. Pat. No. 4,336,113, and U.S. Pat. No. 4,184,932 can be used in addition to the above-described acid.

The concentration of the acidic solution is preferably in a range of 0.1% to 2.5% by mass and particularly preferably in a range of 0.2% to 2.0% by mass. Further, the liquid temperature of the acidic solution is preferably in a range of 20° C. to 80° C. and more preferably in a range of 30° C. to 60° C.

An aqueous solution mainly containing the acid can be used by adding at least one of a nitric acid compound having a nitrate ion such as aluminum nitrate, sodium nitrate, or ammonium nitrate, a hydrochloric acid compound having a hydrochloride ion such as aluminum chloride, sodium chloride, or ammonium chloride, or a sulfuric acid compound having a sulfate ion such as aluminum sulfate, sodium sulfate, or ammonium sulfate to an aqueous solution containing an acid with a concentration of 1 to 100 g/L until saturation occurs from an amount of 1 g/L.

Further, metals contained in an aluminum alloy such as iron, copper, manganese, nickel, titanium, magnesium, and silica may be dissolved in an aqueous solution mainly containing the acid. It is preferable that a liquid to which aluminum chloride, aluminum nitrate, or aluminum sulfate has been added is used such that the amount of aluminum ions in an aqueous solution having an acid with a concentration of 0.1% to 2% by mass is in a range of 1 to 100 g/L.

In an electrochemical dissolution treatment, the direct current is mainly used. In a case where the alternating current is used, the AC power supply wave thereof is not particularly limited, and a sine wave, a square wave, a trapezoidal wave, or a triangular wave is used. Among these, a square wave or a trapezoidal wave is preferable and a trapezoidal wave is particularly preferable.

(Nitric Acid Electrolysis)

In the present invention, through-holes having an average opening diameter of 0.1 μm or greater and less than 100 μm can be easily formed by performing an electrochemical dissolution treatment (hereinafter, simply referred to as a "nitric acid dissolution treatment") using an electrolytic solution mainly containing nitric acid.

Here, from the viewpoint of easily controlling the dissolution point for forming through-holes, it is preferable that the nitric acid dissolution treatment is an electrolytic treatment performed under conditions of an average current density of 5 A/dm$^2$ or greater and an electric quantity of 50 C/dm$^2$ or greater using the direct current. Further, the average current density is preferably 100 A/dm$^2$ or less and the electric quantity is preferably 10000 C/dm$^2$ or less.

The concentration and the temperature of the electrolytic solution in the nitric acid electrolysis are not particularly limited. For example, the electrolysis can be performed in a temperature range of 30° C. to 60° C. using a nitric acid electrolytic solution having a nitric acid concentration of 15% to 35% by mass, which is a high concentration, and the electrolysis can be performed at 80° C. or higher, which is a high temperature, using a nitric acid electrolytic solution having a nitric acid concentration of 0.7% to 2% by mass.

Further, the electrolysis can be performed using an electrolytic solution obtained by mixing at least one of sulfuric acid, oxalic acid, or phosphoric acid having a concentration of 0.1% to 50% by mass with the above-described nitric acid electrolytic solution.

(Hydrochloric Acid Electrolysis)

In the present invention, through-holes having an average opening diameter of 1 μm or greater and less than 100 μm can be easily formed by performing an electrochemical dissolution treatment (hereinafter, simply referred to as a "hydrochloric acid dissolution treatment") using an electrolytic solution mainly containing nitric acid.

Here, from the viewpoint of easily controlling the dissolution point for forming through-holes, it is preferable that the hydrochloric acid dissolution treatment is an electrolytic treatment performed under conditions of an average current density of 5 A/dm$^2$ or greater and an electric quantity of 50 C/dm$^2$ or greater using the direct current. Further, the average current density is preferably 100 A/dm$^2$ or less and the electric quantity is preferably 10000 C/dm$^2$ or less.

The concentration and the temperature of the electrolytic solution in the hydrochloric acid electrolysis are not particularly limited. For example, the electrolysis can be performed in a temperature range of 30° C. to 60° C. using a hydrochloric acid electrolytic solution having a hydrochloric acid concentration of 10% to 35% by mass, which is a high concentration, and the electrolysis can be performed at 80° C. or higher, which is a high temperature, using a hydrochloric acid electrolytic solution having a hydrochloric acid concentration of 0.7% to 2% by mass.

Further, the electrolysis can be performed using an electrolytic solution obtained by mixing at least one of sulfuric acid, oxalic acid, or phosphoric acid having a concentration of 0.1% to 50% by mass with the above-described hydrochloric acid electrolytic solution.

[Film Removing Step]

The film removing step is a step of removing an aluminum hydroxide film by performing a chemical dissolution treatment.

In the film removing step, an aluminum hydroxide film can be removed by performing, for example, an acid etching treatment or an alkali etching treatment described below.

<Acid Etching Treatment>

The dissolution treatment is a treatment of dissolving an aluminum hydroxide film using a solution (hereinafter, referred to as an "aluminum hydroxide dissolving solution") that preferentially dissolves aluminum hydroxide rather than aluminum.

Here, as the aluminum hydroxide dissolving solution, an aqueous solution containing at least one selected from the group consisting of nitric acid, hydrochloric acid, sulfuric acid, phosphoric acid, oxalic acid, a chromium compound, a zirconium compound, a titanium compound, a lithium salt, a cerium salt, a magnesium salt, sodium silicofluoride, zinc fluoride, a manganese compound, a molybdenum compound, a magnesium compound, a barium compound, and a halogen simple substance is preferable.

Specifically, examples of the chromium compound include chromium (III) oxide and chromic anhydride (VI).

Examples of the zirconium compound include zirconium ammonium fluoride, zirconium fluoride, and zirconium chloride.

Examples of the titanium compound include titanium oxide and titanium sulfide.

Examples of the lithium salt include lithium fluoride and lithium chloride.

Examples of the cerium salt include cerium fluoride and cerium chloride.

Examples of magnesium salt include magnesium sulfide.

Examples of the manganese compound include sodium permanganate and calcium permanganate.

Examples of the molybdenum compound include sodium molybdate.

Examples of the magnesium compound include magnesium fluoride-pentahydrate.

Examples of the barium compound include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, and hydrates of these.

Among these barium compounds, barium oxide, barium acetate, or barium carbonate is preferable and barium oxide is particularly preferable.

Examples of the halogen simple substance include chlorine, fluorine, and bromine.

Among these, it is preferable that the aluminum hydroxide dissolving solution is an aqueous solution containing an acid. Examples of the acid include nitric acid, hydrochloric acid, sulfuric acid, phosphoric acid, and oxalic acid, and a mixture of two or more kinds of acids may be used.

The acid concentration is preferably 0.01 mol/L or greater, more preferably 0.05 mol/L or greater, and still more preferably 0.1 mol/L or greater. The upper limit thereof is not particularly limited, but is preferably 10 mol/L or less and more preferably 5 mol/L or less.

The dissolution treatment is performed by bringing the aluminum substrate on which an aluminum hydroxide film is formed into contact with the above-described dissolving solution. The method of bringing the substrate into contact with the solution is not particularly limited, and examples thereof include an immersion method and a spray method. Among these, an immersion method is preferable.

The immersion method is a treatment of immersing the aluminum substrate on which an aluminum hydroxide film is formed in the above-described dissolving solution. From the viewpoint of performing the treatment without unevenness, it is preferable that the dissolving solution is stirred during this immersion treatment.

The time for the immersion treatment is preferably 10 minutes or longer, more preferably 1 hour or longer, and still more preferably 3 hours or longer or 5 hours or longer.

<Alkali Etching Treatment>

The alkali etching treatment is a treatment of dissolving the surface layer by bringing the aluminum hydroxide film into contact with an alkali solution.

Examples of the alkali used in the alkali solution include a caustic alkali and an alkali metal salt. Specific examples of the caustic alkali include sodium hydroxide (caustic soda) and caustic potash. Further, examples of the alkali metal salt include alkali metal silicate such as sodium metasilicate, sodium silicate, potassium metasilicate, and potassium silicate; alkali metal carbonate such as sodium carbonate and potassium carbonate; alkali metal aluminate such as sodium aluminate and potassium aluminate; alkali metal aldonate such as sodium gluconate and potassium gluconate; and alkali metal hydrogen phosphate such as disodium phosphate, dipotassium phosphate, trisodium phosphate, and tripotassium phosphate. Among these, from the viewpoints of a high etching speed and low cost, a solution containing a caustic alkali or a solution containing both of a caustic alkali and alkali metal aluminate is preferable. Further, an aqueous solution containing sodium hydroxide is preferable.

The concentration of the alkali solution is preferably in a range of 0.1% to 50% by mass and more preferably in a range of 0.2% to 10% by mass. In a case where aluminum ions are dissolved in an alkali solution, the concentration of the aluminum ions is preferably in a range of 0.01% to 10% by mass and more preferably in a range of 0.1% to 3% by mass. The temperature of the alkali solution is preferably in a range of 10° C. to 90° C. The treatment time is preferably in a range of 1 to 120 seconds.

Examples of the method of bringing an aluminum hydroxide film into contact with an alkali solution include a method of allowing an aluminum substrate on which an aluminum hydroxide film is formed to pass through a bath to which an alkali solution has been added, a method of immersing an aluminum substrate on which an aluminum hydroxide film is formed in a bath to which an alkali solution has been added, and a method of spraying an alkali solution to the surface (aluminum hydroxide film) of an aluminum substrate on which an aluminum hydroxide film has been formed.

[Roughening Treatment Step]

In the present invention, an optional roughening treatment step which may be included in the method of producing the soundproofing structure is a step of performing an electrochemical roughening treatment (hereinafter, also simply referred to as an "electrolytic roughening treatment") on an aluminum substrate from which an aluminum hydroxide film has been removed to roughen the front surface or the rear surface of the aluminum substrate.

Further, according to the embodiment, the configuration on which the roughening treatment is performed after the through-holes are formed is employed, but the present invention is not limited thereto, and a configuration in which the through-holes are formed after the roughening treatment may be employed.

In the present invention, the surface can be easily roughened by performing an electrochemical roughening treatment (hereinafter, also simply referred to as a "nitric acid electrolysis") using an electrolytic solution mainly containing nitric acid.

Alternatively, the surface can be roughened by performing an electrochemical roughening treatment (hereinafter, also simply referred to as "hydrochloric acid electrolysis") using an electrolytic solution mainly containing hydrochloric acid.

[Metal Coating Step]

In the present invention, from the viewpoint that the average opening diameter of the through-holes formed by the above-described electrodissolution treatment can be adjusted to be in a small range of 0.1 μm to 20 μm, it is preferable that the method of producing the soundproofing structure includes a metal coating step of coating a part or the entirety of the surface of the aluminum substrate having at least the inner walls of the through-holes with a metal other than aluminum after the above-described film removing step.

Here, the expression "coating a part or the entirety of the surface of the aluminum substrate having at least the inner walls of the through-holes with a metal other than aluminum" means that at least the inner walls of the through-holes in the entire surface of the aluminum substrate having the inner walls of the through-holes are coated with a metal, and the surface other than the inner walls may not be coated or a part or the entirety of the surface may be coated.

The metal coating step is carried out by performing a substitution treatment and a plating treatment described below on the aluminum substrate having through-holes.

<Substitution Treatment>

The substitution treatment is a treatment of performing substitution plating on a part or the entirety of the surface of the aluminum substrate having at least the inner walls of the through-holes with zinc or a zinc alloy.

As a substitution plating liquid, a mixed solution of 120 g/L of sodium hydroxide, 20 g/L of zinc oxide, 2 g/L of iron (III) chloride, 50 g/L of Rochelle salt, and 1 g/L of sodium nitrate may be exemplified.

Further, commercially available Zn or a Zn alloy plating liquid may be used, and examples thereof include SUBSTR Zn-1, Zn-2, Zn-3, Zn-8, Zn-10, Zn-111, Zn-222, and Zn-291 (all manufactured by OKUNO CHEMICAL INDUSTRIES CO., LTD.) can be used.

The time of immersing such a substitution plating liquid in an aluminum substrate is preferably in a range of 15 seconds to 40 seconds and the immersion temperature is preferably in a range of 20° C. to 50° C.

<Plating Treatment>

In a case where a zinc film is formed by performing the above-described substitution treatment on the surface of the aluminum substrate for substitution plating of zinc or a zinc alloy, for example, it is preferable to perform a plating treatment of substituting the zinc film with nickel through electroless plating described below and allowing various metals to be deposited through electrolytic plating described below.

(Electroless Plating Treatment)

Commercially available products can be widely used as a nickel plating liquid used for the electroless plating treatment, and an aqueous solution containing 30 g/L of nickel sulfate, 20 g/L of sodium hypophosphite, and 50 g/L of ammonium citrate is exemplified.

Further, examples of the nickel alloy plating liquid include a Ni—P alloy plating liquid containing a phosphorus compound as a reducing agent and a Ni—B plating liquid containing a boron compound as a reducing agent.

The time of immersion in such a nickel plating liquid or a nickel alloy plating liquid is preferably in a range of 15 seconds to 10 minutes and the immersion temperature is preferably in a range of 30° C. to 90° C.

(Electrolytic Plating Treatment)

In an electrolytic plating treatment, as a plating liquid in a case of electroplating Cu, a plating liquid obtained by adding 60 to 110 g/L of Cu sulfate, 160 to 200 g/L of sulfuric acid, and 0.1 to 0.15 mL/L of hydrochloric acid to pure water and adding 1.5 to 5.0 mL/L of TOP LUCINA SF base WR, 0.5 to 2.0 mL/L of TOP LUCINA SF-B, and 3.0 to 10 mL/L of TOP LUCINA SF LEVELER (manufactured by OKUNO CHEMICAL INDUSTRIES CO., LTD.) as additives is exemplified.

The time of immersion in such a copper plating liquid is not particularly limited since the time depends on the thickness of the Cu film. However, in a case where a Cu film having a thickness of 2 μm is formed, it is preferable that the Cu film is immersed at a current density of 2 A/dm$^2$ for approximately 5 minutes and the immersion temperature is preferably in a range of 20° C. to 30° C.

[Water Washing Treatment]

In the present invention, it is preferable that a water washing treatment is performed after each treatment step described above is completed. For the water washing treatment, pure water, well water, or tap water can be used. A nip device may be used to prevent carry-on of a treatment liquid to the next step.

The soundproofing structure may be produced using a cut sheet-like aluminum substrate or according to a roll-to-roll (hereinafter, also referred to as RtoR) system.

As is well known, RtoR is a production method of drawing a raw material from a roll formed by winding a long raw material, transporting the material in the longitudinal direction, performing various treatments such as a surface treatment, and winding the treated raw material in a roll shape again.

According to the production method of forming through-holes in the aluminum substrate as described above, through-holes having an opening diameter of approximately 20 μm can be easily and efficiently formed using RtoR.

Further, the method of forming through-holes is not limited to the above-described method, and through-holes may be formed according to a known method depending on the material for forming the plate-like member.

For example, in a case where a resin film such as a PET film is used as a plate-like member, through-holes can be formed according to a processing method of absorbing energy such as laser processing; or a machining method using physical contact such as needle processing.

The soundproofing structure of the present invention is not limited to those used in various equipment such as the above-described industrial equipment, transportation equipment, and general household equipment, and the soundproofing structure can be used as a fixed wall such as a fixed partition structure (partition) that is disposed in a building room and partitions the inside the room or a movable wall such as a movable partition structure (partition) that is disposed in a building room and partitions the inside of the room.

As described above, by using the soundproofing structure of the present invention, the sound can be suitably shielded between partitioned spaces. Further, particularly in a case of a movable partition, the thin and lightweight structure of the present invention is highly advantageous from the viewpoint that this structure is easy to carry.

Further, the soundproofing structure of the present invention can be suitably used as a window member because the soundproofing structure has a light transmittance and ventilation properties.

Alternatively, the soundproofing structure can be used as a cage that surrounds equipment serving as a noise source, for example, an outdoor air conditioner or a water heater, for the purpose of preventing the noise. By surrounding the noise source with the present member, the sound can be absorbed while ensuring heat dissipation or ventilation properties so that the noise can be prevented.

Further, the soundproofing structure may be used for a cage for pet raising. A pet cage which is lightweight and has an acoustic absorption effect can be obtained by applying the member of the present invention to a part or the entirety of the cage for pet raising and, for example, replacing one surface of the pet cage with the present member. By using this cage, it is possible to protect a pet in the cage from the outside noise and to prevent leakage of crying sound of the pet in the cage to the outside.

The soundproofing structure of the present invention can be used as the following soundproofing members in addition to those described above.

Examples of the soundproofing members having the soundproofing structure of the present invention are as follows.

a soundproofing member for a building material: a soundproofing member used as a building material;

a soundproofing member for air conditioning equipment: a soundproofing member which is installed in a ventilation opening or a duct for air conditioning and prevents noise from the outside;

a soundproofing member for an external opening portion: a soundproofing member which is installed on a window in a room and prevents noise from the inside or outside the room;

a soundproofing member for a ceiling: a soundproofing member which is installed on a ceiling in a room and controls the acoustic sound in the room;

a soundproofing member for a floor: a soundproofing member which is installed on a floor and controls the acoustic sound in the room;

a soundproofing member for an internal opening portion: a soundproofing member which is installed on a door or bran in a room and prevents noise from each room;

a soundproofing member for a toilet: a soundproofing member which is installed in a toilet or on a door (inside and outside the room) and prevents noise from the toilet;

a soundproofing member for a balcony: a soundproofing member which is installed in a balcony and prevents noise from the balcony or other balconies adjacent thereto;

an indoor articulating member: a soundproofing member for controlling the acoustic sound in a room;

a simple soundproofing chamber member: a soundproofing member which can be easily assembled and is easy to carry;

a soundproofing chamber member for pets: a soundproofing member which surrounds a pet's room and prevents noise;

amusement facilities: a soundproofing member which is installed in a game center, a sports center, a concert hall, or a movie theater;

a soundproofing member for surrounding a construction site: a soundproofing member which covers a construction site and prevents leakage of the noise around the site; and a soundproofing member for a tunnel: a soundproofing member which is installed in a tunnel and prevents leakage of the noise to the inside or outside the tunnel.

EXAMPLES

The present invention will be described in more detail based on the following examples. The materials, the amounts of use, the proportions, the treatment contents, and the treatment procedures described in the following examples can appropriately be changed within the range not departing from the gist of the present invention. Accordingly, the scope of the present invention should not be limitatively interpreted by the following examples.

Example 1

<Preparation of Soundproofing Structure>

The treatments described below were performed on a surface of an aluminum substrate (JIS H-4160, alloy No.: 1N30-H, aluminum purity: 99.30%) having an average thickness of 20 μm and a size of 210 mm×297 mm (A4 size), thereby preparing a soundproofing structure 10.

(a1) Aluminum Hydroxide Film Forming Treatment (Film Forming Step)

The aluminum substrate was used as a cathode, and an electrolytic treatment was performed thereon for 20 seconds under a condition of a total electric quantity of 1000 $C/dm^2$ using an electrolytic solution (nitric acid concentration of 10 g/L, sulfuric acid concentration of 6 g/L, aluminum concentration of 4.5 g/L, flow rate of 0.3 m/s) whose temperature was kept to 50° C. to form an aluminum hydroxide film on the aluminum substrate. Further, the electrolytic treatment was performed using a DC power supply. The current density was 50 $A/dm^2$.

After formation of the aluminum hydroxide film, the film was washed with water using a spray.

(b1) Electrodissolution Treatment (Through-Hole Forming Step)

Next, the aluminum substrate was used as an anode, and an electrolytic treatment was performed thereon for 24 seconds under a condition of a total electric quantity of 600 $C/dm^2$ using an electrolytic solution (nitric acid concentration of 10 g/L, sulfuric acid concentration of 6 g/L, aluminum concentration of 4.5 g/L, flow rate of 0.3 m/s) whose temperature was kept to 50° C. to form through-holes in the aluminum substrate and the aluminum hydroxide film. Further, the electrolytic treatment was performed using a DC power supply. The current density was 25 A/dm$^2$.

After formation of the through-holes, the film was washed with water using a spray.

(c1) Aluminum Hydroxide Film Removing Treatment (Film Removing Step)

Next, the aluminum hydroxide film was dissolved and removed by immersing the aluminum substrate on which the electrodissolution treatment had been performed in an aqueous solution (liquid temperature of 35° C.) with a sodium hydroxide concentration of 50 g/L and an aluminum ion concentration of 3 g/L for 32 seconds and then immersing the aluminum substrate in an aqueous solution (liquid temperature of 50° C.) with a nitric acid concentration of 10 g/L and an aluminum ion concentration of 4.5 g/L for 40 seconds.

Thereafter, the resultant was washed with water using a spray and dried, thereby preparing a soundproofing structure 10 having through-holes.

The average opening diameter and the average opening ratio of the through-holes in the prepared soundproofing structure were measured, and the average opening diameter was 24 μm and the average opening ratio was 5.3%.

Further, the surface shape of the inner wall surface of each through-hole in the prepared soundproofing structure was measured using an AFM (SPA300, manufactured by High-Tech Science Corporation). The measurement was carried out using OMCL-AC200TS as a cantilever in a dynamic force mode (DFM).

Figure 6:
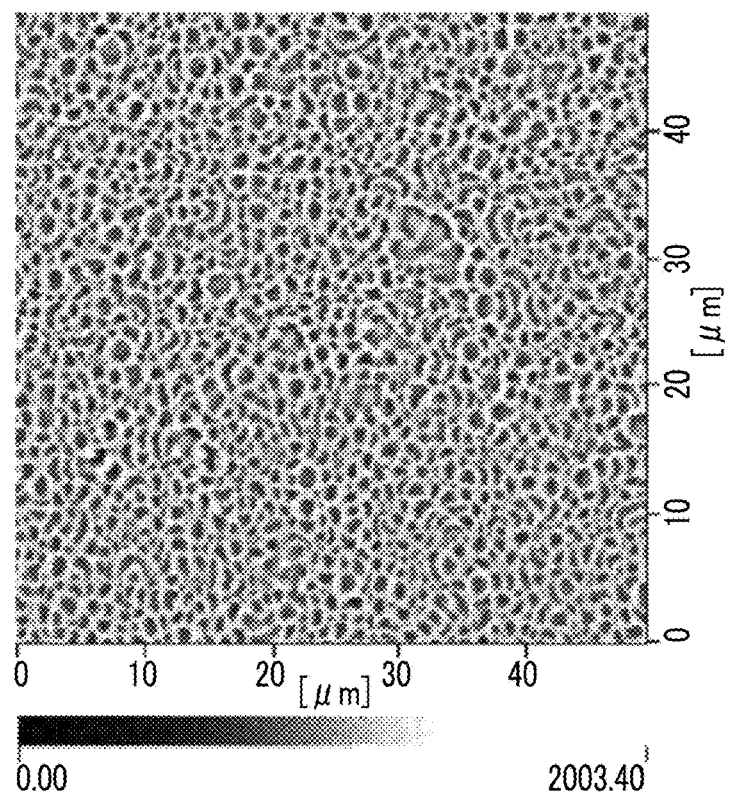
FIG. 6 is an image showing the results of AFM measurement performed on an inner wall surface of a through-hole.

The results are shown in FIG. 6.

Further, an SEM photo obtained by imaging the inner wall surface of each through-hole is shown in FIG. 7.

Based on FIGS. 6 and 7, it was found that the inner wall surface of the through-hole was roughened. Further, Ra was 0.18 (μm). The specific surface area in this case was 49.6%.

[Evaluation]

<Acoustic Characteristics>

The acoustic characteristics of the prepared soundproofing structure were measured according to a transfer function method using four microphones with a self-making acrylic acoustic tube. This technique is based on "ASTM E2611-09: Standard Test Method For Measurement of Normal Incidence Sound Transmission of Acoustical Material Based on the Transfer Matrix Method". This measurement method has the same measurement principles as those of the four microphone measurement method using WinZac provided by (Nihon Onkyo Engineering Co., Ltd.). According to this method, the acoustic transmission loss can be measured in a wide spectral band. Particularly, the absorbance of a sample was accurately measured by measuring the transmittance and the reflectivity at the same time and acquiring the absorbance using "1-(transmittance+reflectivity)". The acoustic transmission loss was measured in a frequency range of 100 Hz to 4000 Hz. The inner diameter of the acoustic tube was 40 mm so that the measurement was able to be performed up to a frequency of 4000 Hz or greater.

Figure 8:
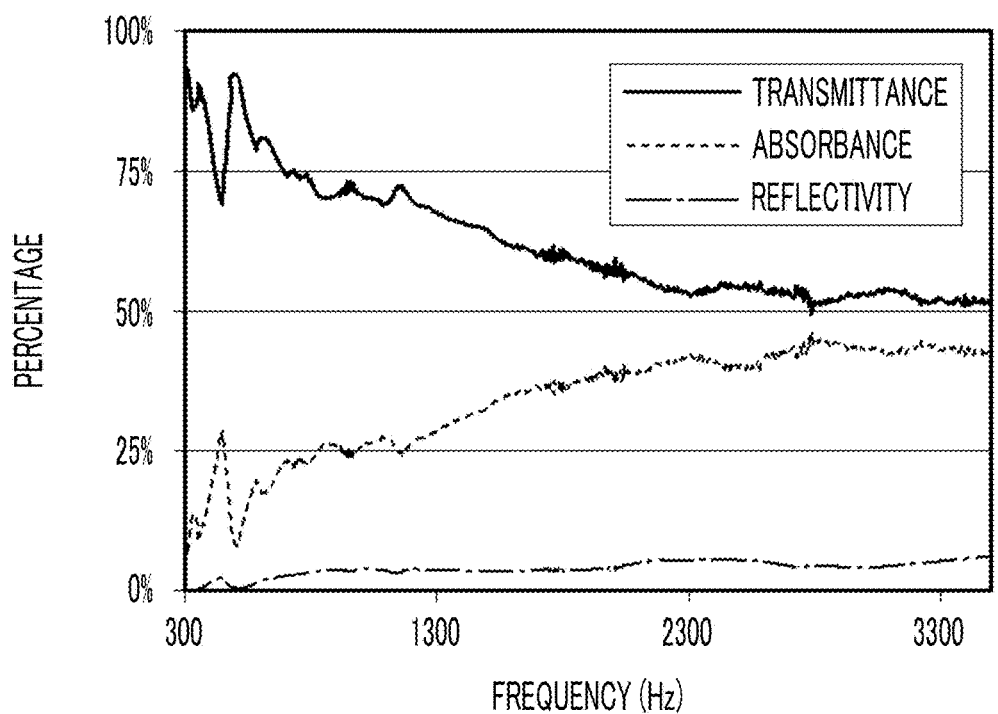
FIG. 8 is a graph showing the relationship between the frequency and the acoustic characteristics.

In this measurement, the soundproofing structure was loosely inserted into the acoustic tube, and the vertical acoustic transmittance, the reflectivity, and the absorbance of the soundproofing structure were measured. The measurement results are shown in FIG. 8. The rate of the absorbance is increased along with an increase in the frequency, and the absorbance reaches 43% at 3000 Hz.

Examples 2 to 17 and Comparative Examples 1 and 2

With reference to WO2016/060037A and WO2016/017380A, soundproofing structures with different average opening diameters and different average opening ratios were prepared by changing the conditions for preparing the soundproofing structure in Example 1 in various manners.

Further, the soundproofing structure of Comparative Example 1 was an aluminum substrate having a thickness of 20 μm, in which through-holes were not opened.

Further, the soundproofing structure of Comparative Example 2 was prepared by forming through-holes having a diameter of 4 mm in the center of an aluminum substrate having a thickness of 20 μm using a punch.

The absorbance of each of the prepared soundproofing structures was measured in the same manner as in Example 1.

The measurement results of the average opening diameter and the average opening ratio in each example and each comparative example, and the absorbance averaged in a range of 2000 Hz to 4000 Hz are listed in Table 1.

Figure 9:
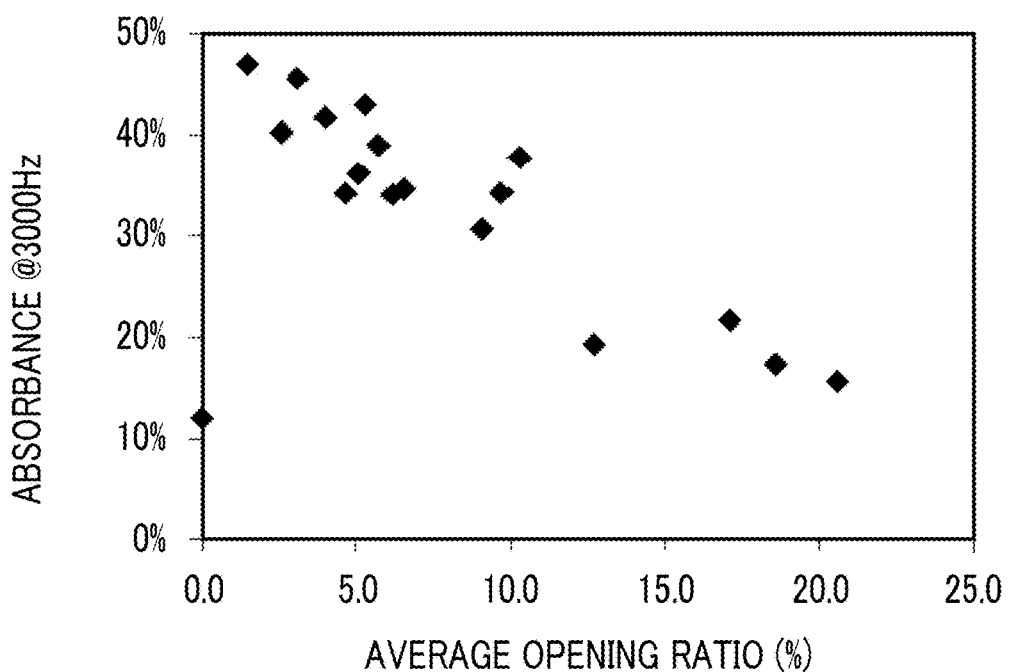
FIG. 9 is a graph showing the relationship between the average opening ratio and the absorbance.

Further, FIG. 9 is a graph showing the relationship between the measured absorbance and the average opening ratio. As shown in FIG. 9, it was found that the absorbance tends to be increased as the average opening ratio is decreased. Further, it was found that the absorbance in each example of the present invention was high compared to that of Comparative Example 1 in which the through-holes were not opened.

TABLE 1

|  | Average opening diameter μm | Average opening ratio % | Absorbance % |
|---|---|---|---|
| Example 1 | 24 | 5.3 | 43.0 |
| Example 2 | 31 | 9.1 | 30.6 |
| Example 3 | 38 | 12.7 | 19.3 |
| Example 4 | 51 | 18.6 | 17.3 |
| Example 5 | 49 | 20.6 | 15.7 |
| Example 6 | 12 | 1.5 | 47.0 |
| Example 7 | 21 | 10.3 | 37.8 |
| Example 8 | 31 | 17.1 | 21.6 |
| Example 9 | 24 | 9.7 | 34.2 |
| Example 10 | 15 | 3.1 | 45.6 |
| Example 11 | 16 | 4 | 41.7 |
| Example 12 | 19 | 6.2 | 34.1 |
| Example 13 | 16 | 4.7 | 34.2 |
| Example 14 | 16 | 5.1 | 36.2 |
| Example 15 | 18 | 5.7 | 39.0 |
| Example 16 | 15 | 2.6 | 40.3 |
| Example 17 | 20 | 6.6 | 34.6 |
| Comparative Example 1 | — | — | 12.0 |
| Comparative Example 2 | 4000 | 1 | 7.7 |

Figure 10:
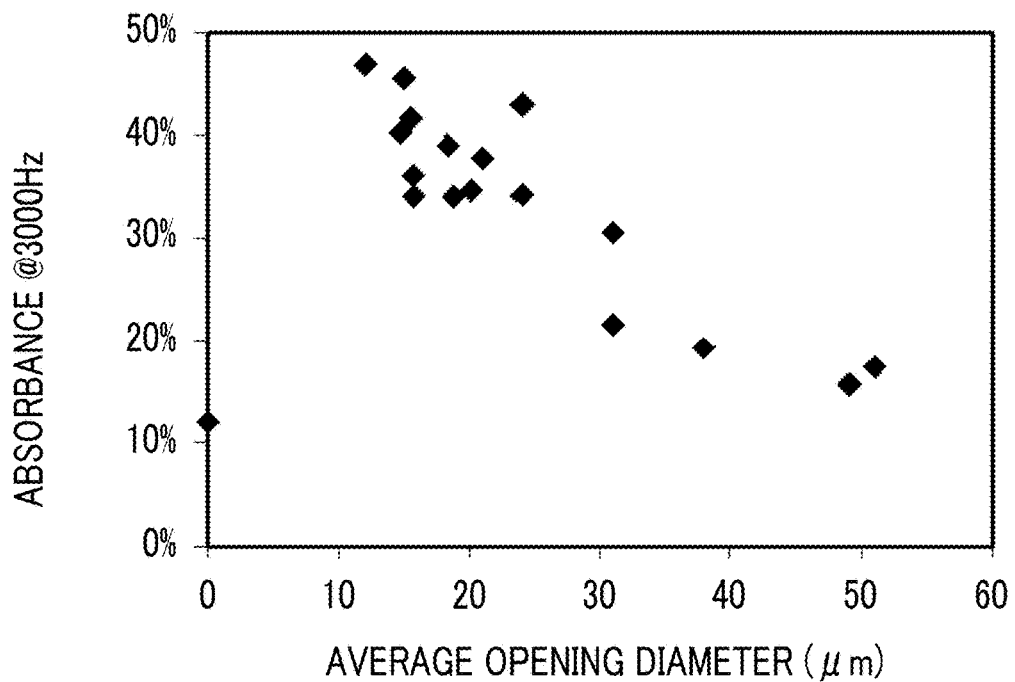
FIG. 10 is a graph showing the relationship between the average opening diameter and the absorbance.

Further, FIG. 10 is a graph showing the relationship between the measured absorbance and the average opening diameter. As shown in FIG. 10, it was found that the absorbance tends to be increased as the average opening diameter is decreased. Further, it was found that the absorbance in each example of the present invention was high compared to that of Comparative Example 1 in which the through-holes were not opened.

In this manner, it was found that the absorbance is increased as the average opening diameter and the average opening ratio of through-holes are decreased.

Examples 18 to 20

Soundproofing structures were prepared by setting the thicknesses of the aluminum substrates (plate-like members) to 20 μm, 50 μm, and 120 μm respectively and changing the preparation conditions such that the average opening diameter and the average opening ratio became close to each other.

The absorbance of each of the prepared soundproofing structures was measured in the same manner as in Example 1.

The measurement results of the average opening diameter and the average opening ratio in each example and each comparative example, and the absorbance at a frequency of 3000 Hz are listed in Table 2. Further, FIG. 11 is a graph showing the measurement results of the frequency and the absorbance in each example.

Figure 11:
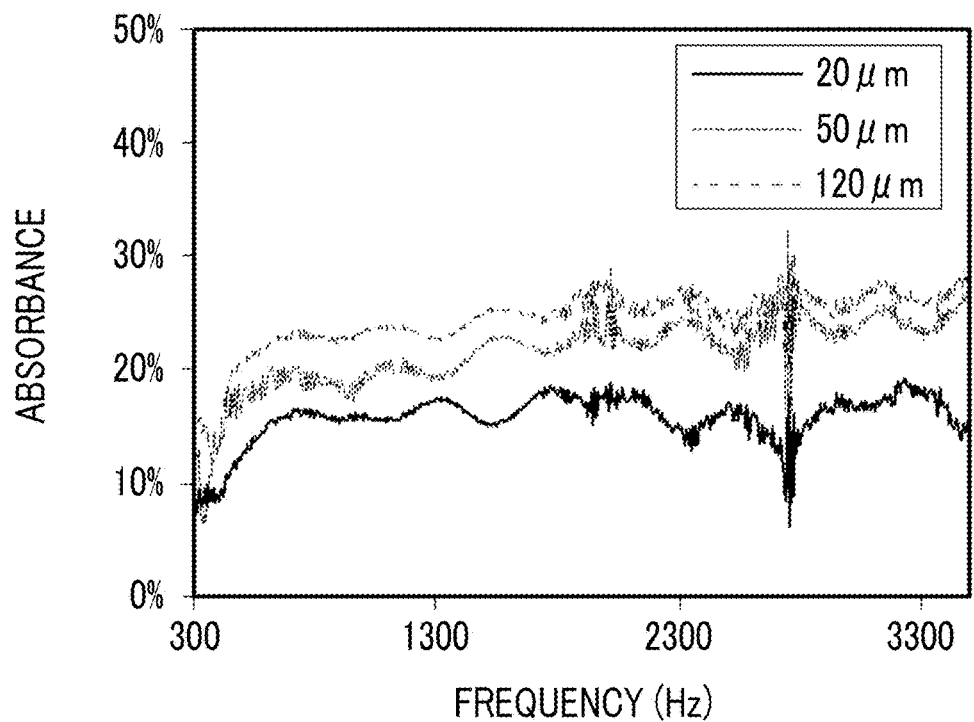
FIG. 11 is a graph showing the relationship between the frequency and the absorbance.

In Table 2 and FIG. 11, it was found that the absorbance tends to be increased as the thickness of the plate-like member is increased.

TABLE 2

| | Thickness μm | Average opening diameter μm | Average opening ratio % | Absorbance (%) @3000 Hz |
|---|---|---|---|---|
| Example 18 | 20 | 43 | 5.2 | 17.1 |
| Example 19 | 50 | 47 | 4.1 | 23.3 |
| Example 20 | 120 | 52 | 4.7 | 25.9 |

Examples 21 to 24

Soundproofing structures were obtained by arranging the soundproofing structures of Example 1 and the soundproofing structures of Example 7 in the thickness direction at intervals of 0 mm, 5 mm, 10 mm, and 10 mm. In other words, the structure of Example 21 was obtained by laminating two soundproofing structures. Further, the structures of Examples 22 to 24 were respectively obtained by arranging two soundproofing structures through a spacer having a thickness of 5 mm and a spacer having a thickness of 10 mm respectively. Further, the structures of Examples 21 to 23 were respectively obtained arranging the soundproofing structures of Example 7 on the noise source side, and the structure of Example 24 was obtained by arranging the soundproofing structures of Example 1 on the noise source side.

The absorbance of each soundproofing structure of Examples 21 to 24 was measured in the same manner as in Example 1.

The measurement results of the absorbance of the soundproofing structure at a frequency of 3000 Hz in each example are listed in Table 3. Further, FIG. 12 is a graph showing the measurement results of the frequency and the absorbance in each example.

Figure 12:
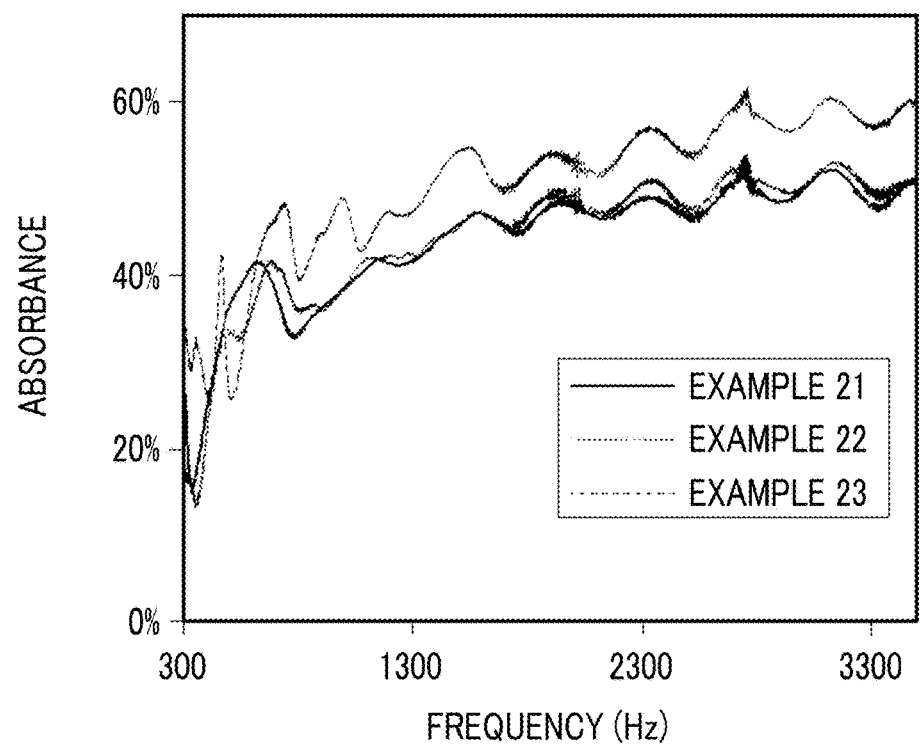
FIG. 12 is a graph showing the relationship between the frequency and the absorbance.

In Table 3 and FIG. 12, it was found that the absorbance is further increased by arranging a plurality of soundproofing structures in the thickness direction compared to a case of using one soundproofing structure. Further, based on the comparison between Example 23 and Example 24, it was found that there is no big difference even in a case where the positions of the soundproofing structures were switched with each other. In addition, based on the comparison among Examples 21 to 23, it was found that the absorbance is further increased in a case where the distance between two soundproofing structures is 10 mm.

TABLE 3

| | First sheet | Second sheet | Distance mm | Absorbance (%) @3000 Hz |
|---|---|---|---|---|
| Example 21 | Soundproofing structure of Example 7 | Soundproofing structure of Example 1 | 0 | 49.6 |
| Example 22 | Soundproofing structure of Example 7 | Soundproofing structure of Example 1 | 5 | 49.9 |
| Example 23 | Soundproofing structure of Example 7 | Soundproofing structure of Example 1 | 10 | 57.3 |
| Example 24 | Soundproofing structure of Example 1 | Soundproofing structure of Example 7 | 10 | 57.0 |

Here, simple calculation was performed in order to estimate the effects of the configurations obtained by arranging two soundproofing structures in the thickness direction. The absorbance in a case where two soundproofing structures were present was calculated by setting the equation of "(calculated absorbance)=(absorbance of Example 7)+(transmittance of Example 7)×(absorbance of Example 1)". As the background, since the wavelength of the sound wave in the frequency band measured at this time is 100 mm or greater and the distance between two soundproofing structures in the range of this example is sufficiently short, the effects of the configurations obtained by arranging two soundproofing structures in the thickness direction can be estimated by the above-described calculation.

Figure 13:
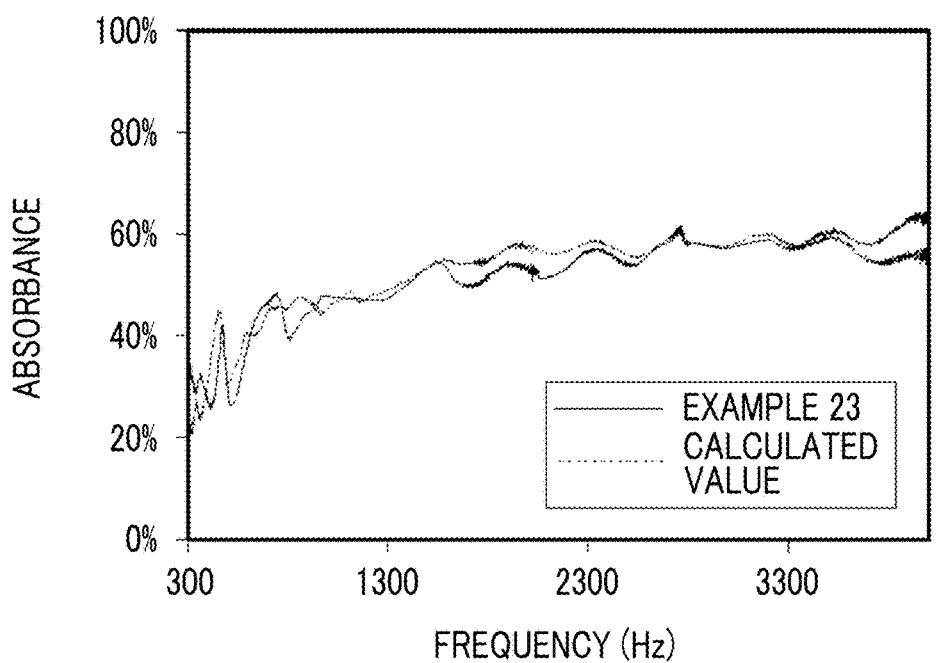
FIG. 13 is a graph showing the relationship between the frequency and the absorbance.

FIG. 13 is a graph showing the calculation results and comparison results with Example 23.

As shown in FIG. 13, it was found that the calculation results and the experimental results match to each other. In other words, it was found that the absorbance of approximately two sheets of soundproofing structures can be obtained by separating two soundproofing structures to have a distance of 10 mm therebetween without the second soundproofing structure being disturbed by the first soundproofing structure.

The sound absorption principle of the soundproofing structure of the present invention is considered to be based on the friction at the time of the sound wave (air) passing through fine through-holes. Accordingly, a sufficiently high local speed at a position of each through-hole is required for sound absorption. In a case where the distance between two soundproofing structures is extremely short, the influence of a decrease in speed due to the friction at the through-holes of the first soundproofing structures remains at the time of the sound reaching the second soundproofing structure, and thus a sufficient local speed cannot be obtained. Therefore, it is considered that the absorbance of the second soundproofing structure is decreased and the absorbance of the entire structure is also decreased.

On the contrary, it is considered that a sufficiently high local speed at the through-holes of the second soundproofing structure can be obtained and the absorbance of approximately two soundproofing structures can be obtained by setting the distance between two soundproofing structures to 10 mm.

Example 25

In order to enable measurement in a higher frequency band, measurement was performed using an acoustic tube having an inner diameter of 20 mm in place of the acoustic tube having an inner diameter of 40 mm used for the measurement of the acoustic characteristics in Example 1. In this case, measurement can be performed up to a frequency of 11000 Hz.

A soundproofing structure having an average opening diameter of 20 µm, an average opening ratio of 4.2%, and a thickness of 20 µm was used to perform measurement with this acoustic tube. The results are shown in FIG. 14.

Figure 14:
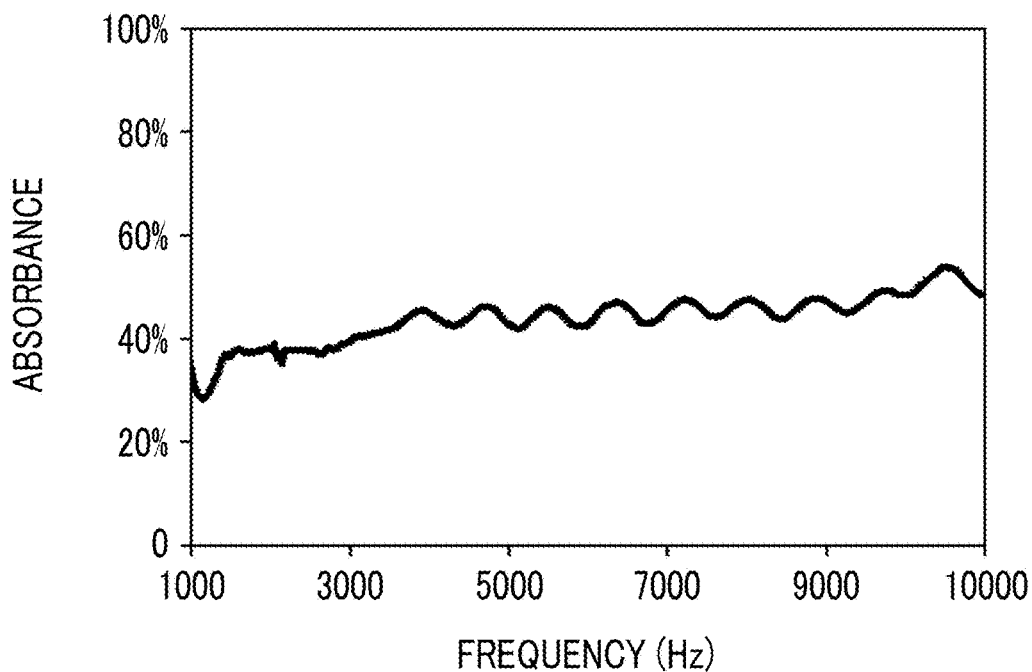
FIG. 14 is a graph showing the relationship between the frequency and the absorbance.

As shown in FIG. 14, it was found that the absorbance due to through-holes exhibit flat characteristics up to a frequency of 1000 Hz or greater, and 40% to 50% of the sound was absorbed even in a case of a high frequency.

The absorption using fine through-holes does not have an absorption peak at a specific frequency and the sound is absorbed in a broadband even at a high frequency.

Examples 26 to 30

As a material other than aluminum, a PET film which is transparent and has a relatively high Young's modulus from among resin films was used to measure absorption using through-holes as described above. As the PET film, LUMIRROR (manufactured by Toray Industries, Inc.) was used.

In Example 26, holes were formed in a PET film having a thickness of 20 µm by adjusting an output using an ultraviolet short pulse laser. In accordance with Example 1, the conditions for having an average opening diameter of 24 µm were found, holes were continuously formed by moving the film, and the number of holes to be formed was adjusted such that the average opening ratio was set to 5.3%, thereby preparing a soundproofing structure.

In Examples 27 to 30, PET films respectively with a thickness of 50 µm, 100 µm, 180 µm, and 250 µm were used, the above-described conditions were found in the same manner as described above, holes were formed through adjustment such that the average opening diameter was set to 24 µm and the average opening ratio was set to 5.3%, thereby preparing each soundproofing structure.

The average opening ratio and the average opening diameter of through-holes were measured using an SEM.

The absorbance of each prepared soundproofing structure was measured in the same manner as in Example 1.

The measurement results of the thickness, the average opening diameter, the average opening ratio, and absorbance and reflectivity averaged in a range of 2000 Hz to 4000 Hz in each example are listed in Table 4.

Further, in comparison of Examples 26 to 30, it was found that the absorption was increased in a case where the thickness of the PET film was 50 µm and the absorption was decreased in a case where the thickness thereof was increased. It was found that the sound transmitted through the PET film was decreased and the sound reflected on the surface of the PET film was increased as the thickness of the PET film increased. Accordingly, a phenomenon in which the sound returned due to reflection is increased before the sound passes through the through-holes and changes into frictional heat because of an increase in thickness of the film and the absorbance is decreased can be considered.

A behavior in which the absorption has a maximum value due to the transmittance and the reflectivity is shown in the following simulation results even in a case where the average opening ratio of through-holes is changed.

Further, based on the results of Examples 26 to 30, it was found that the effect of absorption in a broadband using fine through-holes is not limited to the soundproofing structure obtained by using an aluminum substrate and can be applied to various materials.

Example 31

In Example 31, a soundproofing structure was prepared in the same manner as in Example 12 except that the material of the plate-like member was changed to nickel and a plate-like member having through-holes with an average opening diameter of 19.5 µm and an average opening ratio of 6.2% was used.

Further, a method of forming fine through-holes in a case where nickel was used as the material of the plate-like member is as follows.

First, a plurality of projections respectively having a columnar shape with a diameter of 19.5 µm were formed on the surface of a silicon substrate in a predetermined arrangement pattern according to an etching method using photolithography. The distance between the centers of projections adjacent to each other was set to 70 µm, and the arrangement pattern was set as a square grid arrangement. At this time, the area ratio of the projections was approximately 6%.

Next, nickel was allowed to be electrodeposited on the silicon substrate using this silicon substrate on which projections had been formed as a prototype according to a nickel electroforming method to form a nickel film having a

TABLE 4

| | Material | Thickness µm | Average opening diameter µm | Average opening ratio % | Absorbance % | Reflectivity % |
|---|---|---|---|---|---|---|
| Example 26 | PET film | 20 | 24 | 5.3 | 30.3 | 12.0 |
| Example 27 | PET film | 50 | 24 | 5.3 | 40.1 | 29.7 |
| Example 28 | PET film | 100 | 24 | 5.3 | 37.1 | 48.8 |
| Example 29 | PET film | 180 | 24 | 5.3 | 29.0 | 64.9 |
| Example 30 | PET film | 250 | 24 | 5.3 | 23.8 | 72.5 |

As listed in Tables 1 and 4, in comparison of Example 1 to Examples 26 to 30, the absorbance in a case where the material of the plate-like member was aluminum was greater than the absorbance in a case of the PET film. Since the Young's modulus of aluminum is greater than that of a PET film, it is considered that the through-holes of the plate-like material made of aluminum were further effective so that the transmitted sound was suppressed to be small due to membrane vibration.

thickness of 20 µm. Next, the nickel film was peeled off from the silicon substrate and the surface was polished. In this manner, a plate-like member made of nickel, in which a plurality of through-holes had been formed in a square lattice arrangement, was prepared.

The prepared film was evaluated using an SEM, and the average opening diameter was 19.5 µm, the average opening ratio was 6.2 µm, and the thickness was 20 µm. Further, complete penetration of through-holes through the plate-like member in the thickness direction was also confirmed.

The absorbance of the prepared soundproofing structure was measured in the same manner as in Example 1. The measurement results are shown in FIG. 30.

Figure 30:
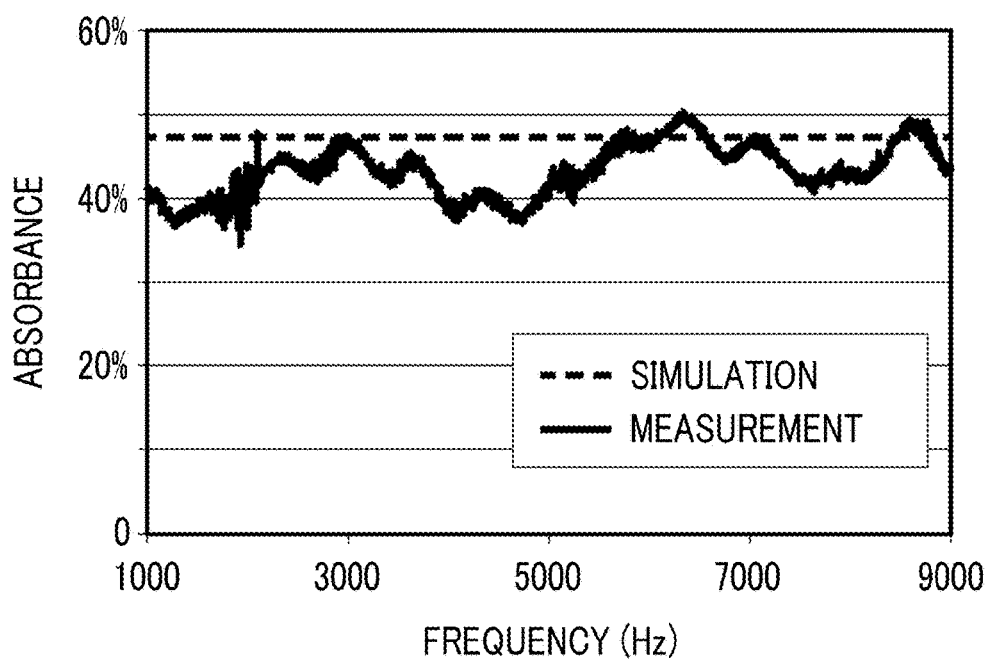
FIG. 30 is a graph showing the relationship between the frequency and the absorbance.

Based on the results shown in FIG. 30, it was found that the absorbance was approximately 40% or greater in a broadband at a frequency of 1000 Hz to 9000 Hz. For example, the absorbance at 3000 Hz was 46.5% and the absorbance at 7000 Hz was 47.3%.

Further, the results obtained by performing the corresponding simulation using an acoustic module COMSOL ver. 5.1 are shown in FIG. 30. The simulation results approximately match to the measurement results. Even from the simulation results, it was found that the sound was absorbed in a broadband.

Even in a case where nickel was used as the material of the plate-like member, it was found that the effect of sound absorption in a broadband using fine through-holes was exhibited.

[Evaluation 2]
<Visibility>

Next, the visibility of through-holes formed in the aluminum film prepared in Example 1 and the visibility of through-holes formed in the nickel film prepared in Example 31 were evaluated.

Figure 31:
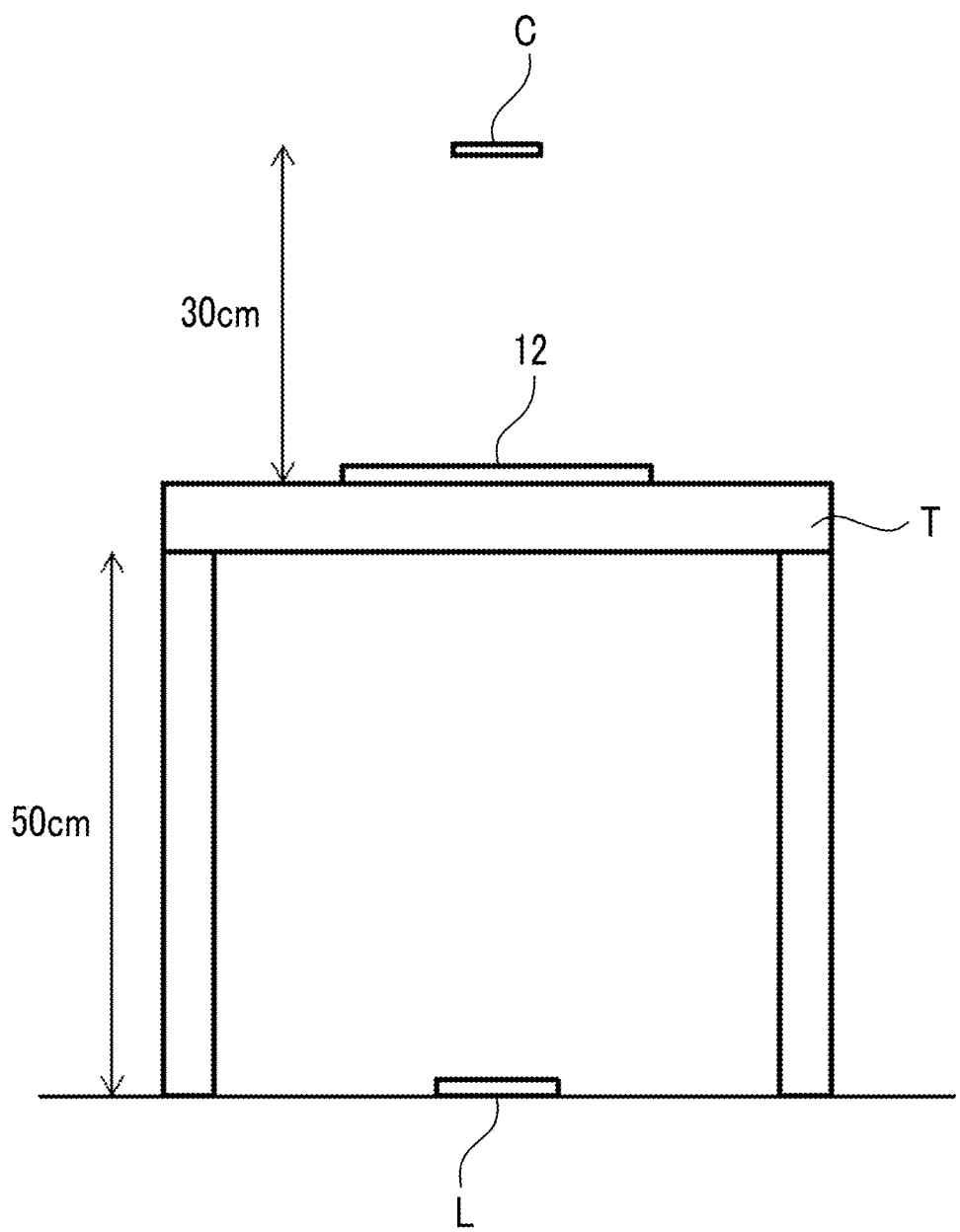
FIG. 31 is a schematic view for describing a method of measuring the visibility.

Specifically, as shown in FIG. 31, the plate-like member 12 was placed on an acrylic plate T having a thickness of 5 mm, and a point light source L (white light of Nexus 5 (manufactured by LG Electronics Incorporated)) was disposed at a position vertically separated from the principal surface of the acrylic plate T by a distance of 50 cm in a direction opposite to the plate-like member 12. Further, a camera C (iPhone 5s (manufactured by Apple Inc.)) was disposed at a position vertically separated from the principal surface of the plate-like member 12 by a distance of 30 cm.

The point light source was turned on and the light transmitted through the through-holes of the plate-like member 12 was visually evaluated from the position of the camera.

Next, transmitted light was imaged with a camera. It was confirmed that the imaged results are the same as those in a case of visual observation.

Figure 32:
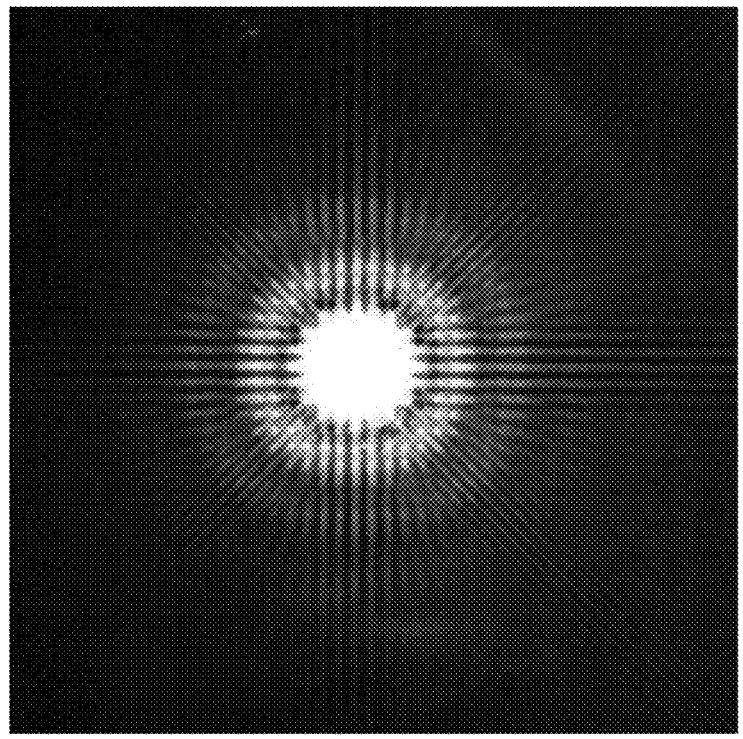
FIG. 32 is an image obtained by imaging the result of measuring the visibility.
Figure 33:
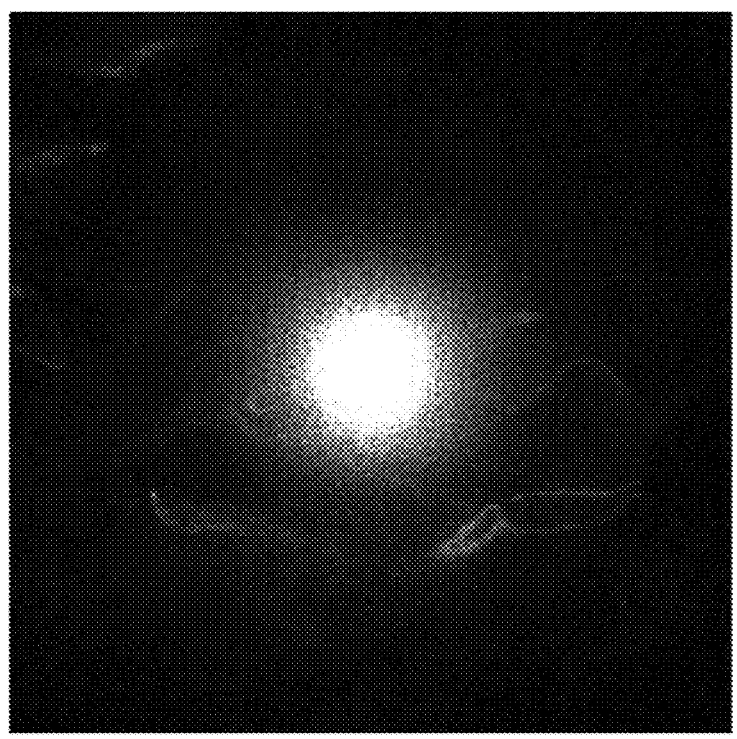
FIG. 33 is an image obtained by imaging the result of measuring the visibility.

FIG. 32 shows the results obtained by imaging a nickel film and FIG. 33 shows results obtained by imaging an aluminum film.

As described above, the nickel film prepared in Example 31 has through-holes which are regularly arranged. Accordingly, as shown in FIG. 32, the light is diffracted to spread out and is seen as a rainbow. Further, in the aluminum film prepared in Example 1, the through-holes are randomly arranged. Therefore, as shown in FIG. 33, a white light source is seen as it is without diffraction of light.

[Simulation 1]

The simulation was performed in order to verify the hypothesis and know the behavior of sound absorption characteristics in a wider range. Since the system of the soundproofing structure of the present invention is an interaction system between membrane vibration and sound waves in air, and the friction occurring from through-holes becomes more important, analysis was performed by adding friction sound absorption due to thermoacoustic in the coupled analysis of the acoustic sound and the vibration.

Specifically, designing was performed using an acoustic module of COMSOL ver. 5.1 (manufactured by COMSOL Inc.) serving as analysis software of a finite element method. By using a thermoacoustic model in the acoustic module, sound absorption can be calculated based on the friction between the wall and sound waves passing through a fluid (including the air). Further, at this time, the membrane vibration of a thin film was taken into the calculation by inputting values of the physical properties of the actual materials. By forming an edge portion into a periodic structure, a model in which through-holes are formed in an infinitely large thin film in the horizontal direction according to the average opening diameter and the average opening ratio was constructed. A freely movable thin film was obtained as a model by fixing the edge portion to a roller to be supported and restricting the portion to freely move in a direction perpendicular to the film so that a freely movable thin film was formed into a model.

Figure 15:
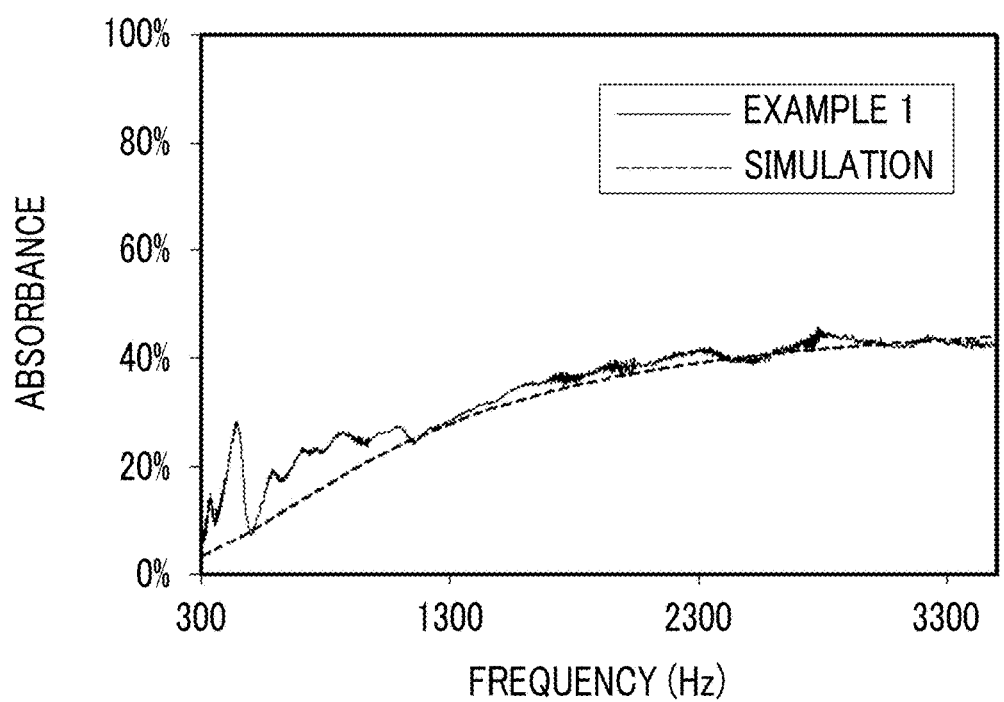
FIG. 15 is a graph showing the relationship between the frequency and the absorbance.

First, the material, the thickness, the average opening diameter, and the average opening ratio respectively corresponding to those in Example 1, and the absorbances obtained from the experiment and the simulation were compared to each other. The results are shown in FIG. 15. It was found that the absorbances from the experiment and the simulation almost match to each other as a whole and match to each other quite well particularly on a high frequency side.

As the result, it was clarified that the sound absorption due to friction occurring at the time of the sound passing through the fine through-holes is a main factor of the sound absorption mechanism of the soundproofing structure of the present invention, the measurement during the experiment was performed according to a technique of loosely fixing the structure to the acoustic tube, and the acoustic characteristics of vertical incidence of the sound into an infinitely large film can be measured using this technique.

[Simulation 2]

The optimum values of the average opening diameter and the average opening ratio were acquired by performing a simulation based on the fact that the results of the simulation 1 matched well to the results of the experiment.

Figure 16:
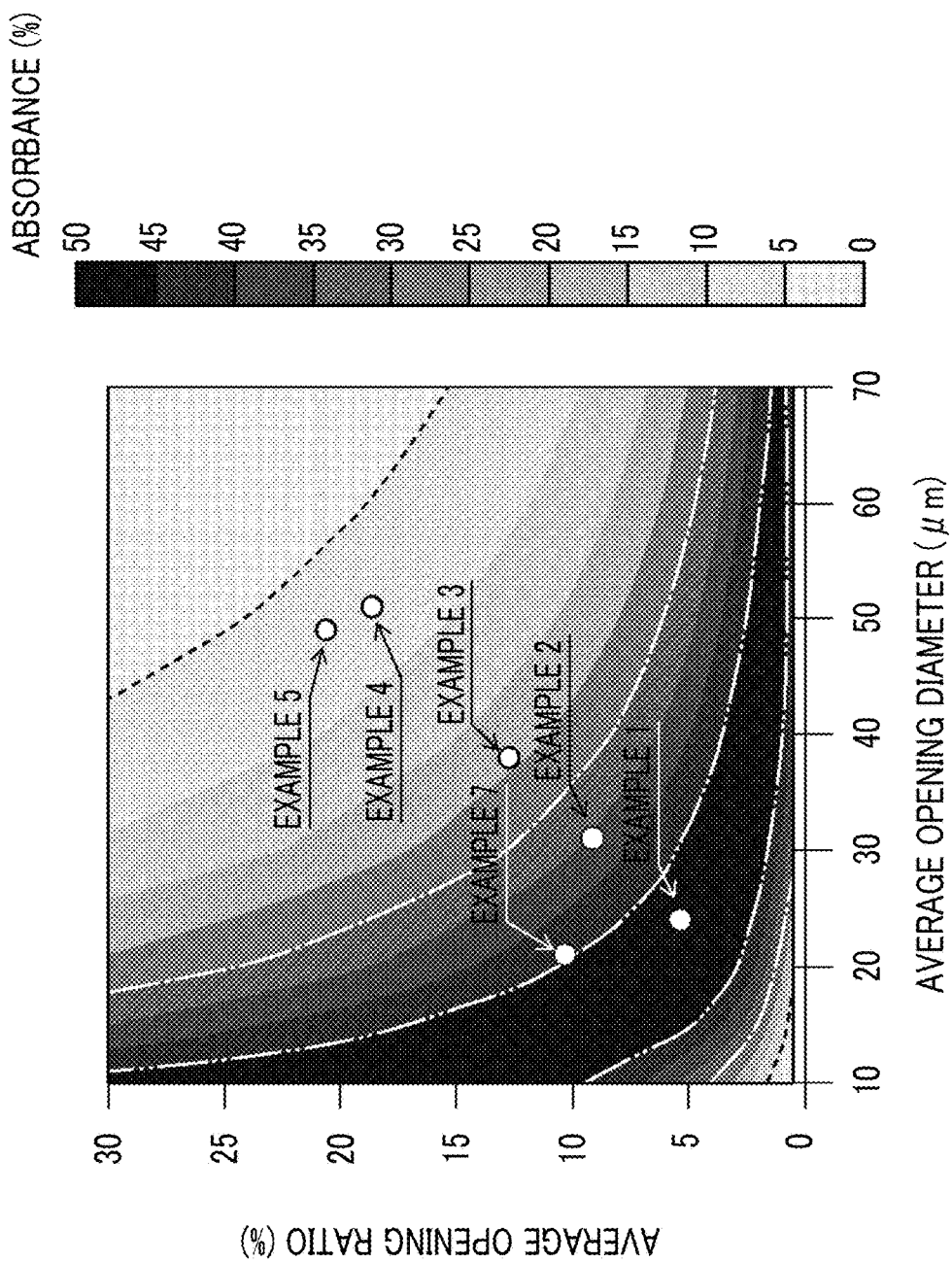
FIG. 16 is a graph showing the relationship between the average opening diameter, the average opening ratio, and the absorbance.

First, the thickness of an aluminum substrate (plate-like member) was fixed to 20 µm and the membrane vibration of the plate-like member was disregarded to acquire only the absorbance based on the friction occurring from fine through-holes. The absorbance at a frequency of 3000 Hz was acquired by changing the average opening diameter and the average opening ratio in various manners. The results are shown in FIG. 16. Results of the average opening diameters and the average opening ratios obtained from several examples were plotted on a graph. Further, in FIG. 16, the boundary of an absorbance of 45% was indicated by a two-dot chain line, the boundary of an absorbance of 30% was indicated by a one dot chain line, and the boundary of an absorbance of 10% was indicated by a broken line.

In regard to the condition in which the absorbance is maximized, the average opening diameter and the average opening ratio are in a relationship of being inversely proportional to each other. Compared to examples, in Example 1 and Example 7, the average opening diameter and the average opening ratio in which the absorbance was maximized were combined, and the absorption was increased even in the actual experiment. In Example 2, the average opening ratio was close to the average opening ratio of Example 7, but the range of the absorbance was smaller than that of Example 7 as the combination of the average opening diameter and the average opening ratio, and the absorbance was small even in the actual experiment. In this manner, it was found that the absorbance from the actual experiment and the simulation are correlated well.

Figure 17:
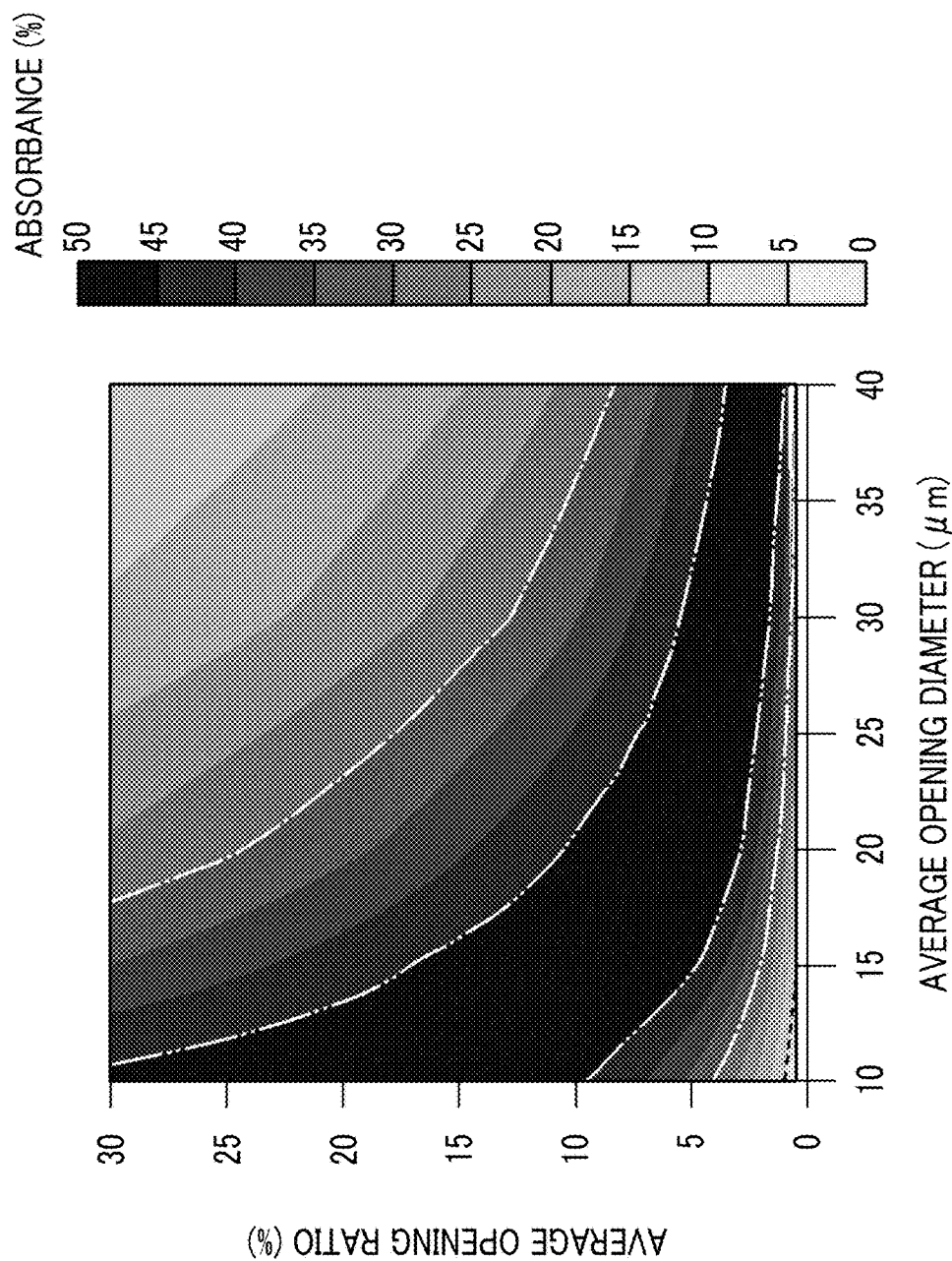
FIG. 17 is a graph showing the relationship between the average opening diameter, the average opening ratio, and the absorbance.
Figure 18:
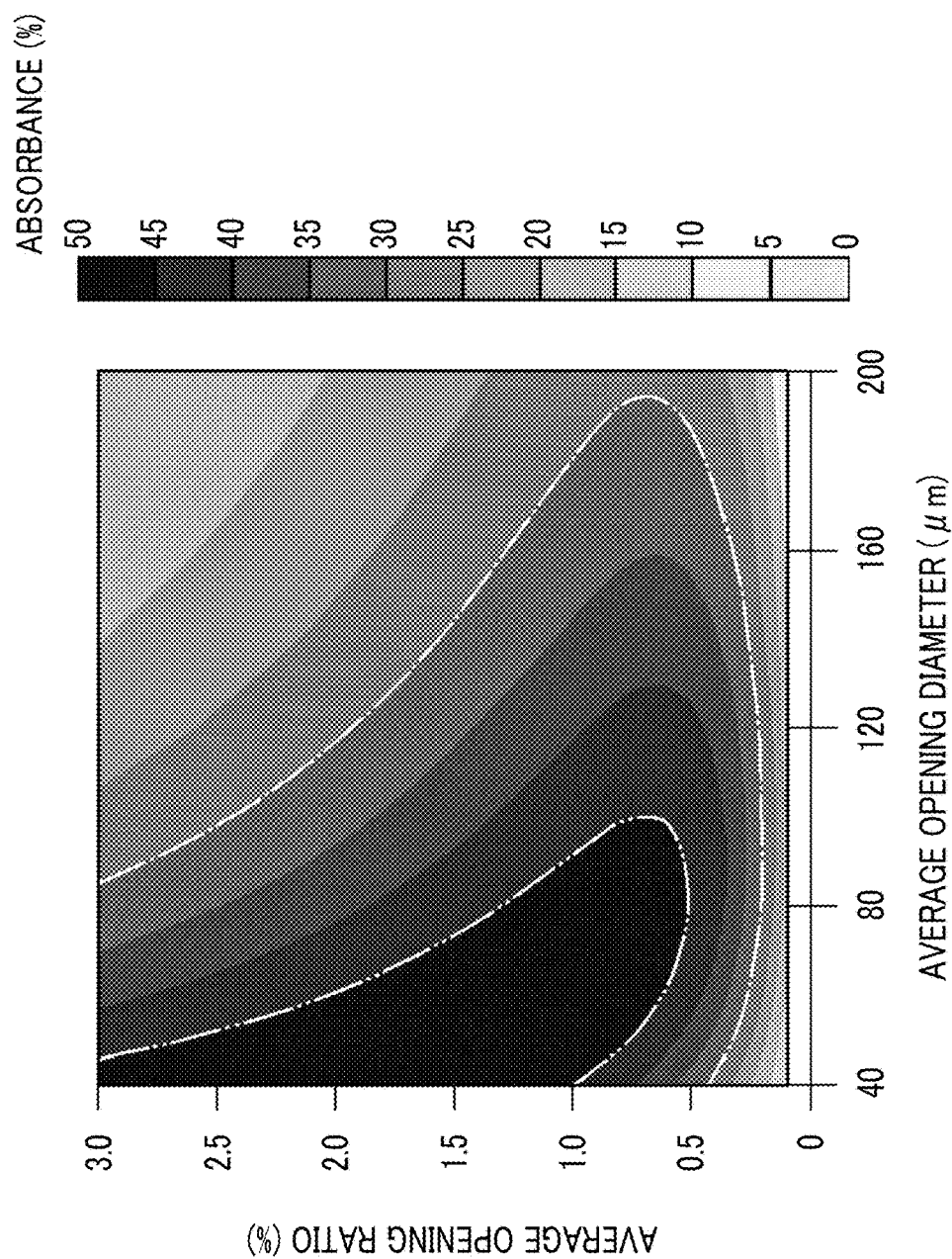
FIG. 18 is a graph showing the relationship between the average opening diameter, the average opening ratio, and the absorbance.

In consideration of the findings described above, calculation was performed by setting the same conditions as described above in a wider range of the average opening diameter. The results are shown in FIGS. 17 and 18. Since the optimum average opening ratio was in a range of 1% or less in a range where the average opening diameter was large, the calculation range was divided into two types. Further, in FIGS. 17 and 18, the boundary of an absorbance of 45% was indicated by a two-dot chain line, the boundary of an absorbance of 30% was indicated by a one dot chain line, and the boundary of an absorbance of 10% was indicated by a broken line.

Characteristically, in a case where the average opening diameter was greater than 70 μm, the maximum value of the absorbance became smaller compared to a case of a smaller average opening diameter regardless of the average opening ratio. In other words, in order to sufficiently obtain the absorption effect using fine through-holes, it was found that the through-holes are preferably small, for example, 70 μm or less.

Figure 19:
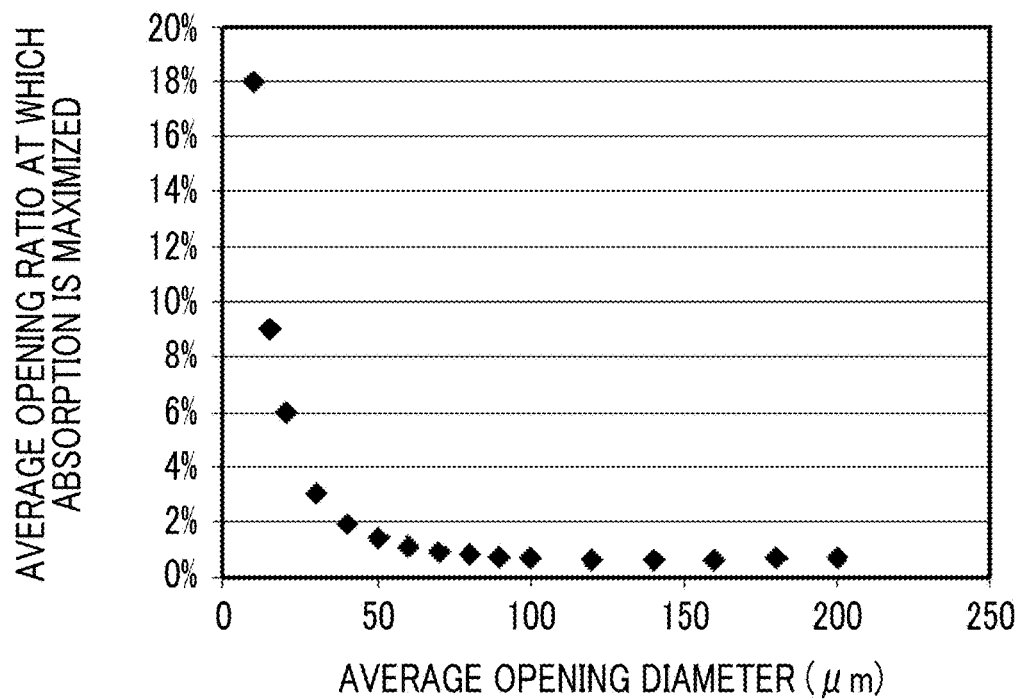
FIG. 19 is a graph showing the relationship between the average opening diameter and an average opening ratio at which the absorbance is maximized.
Figure 20:
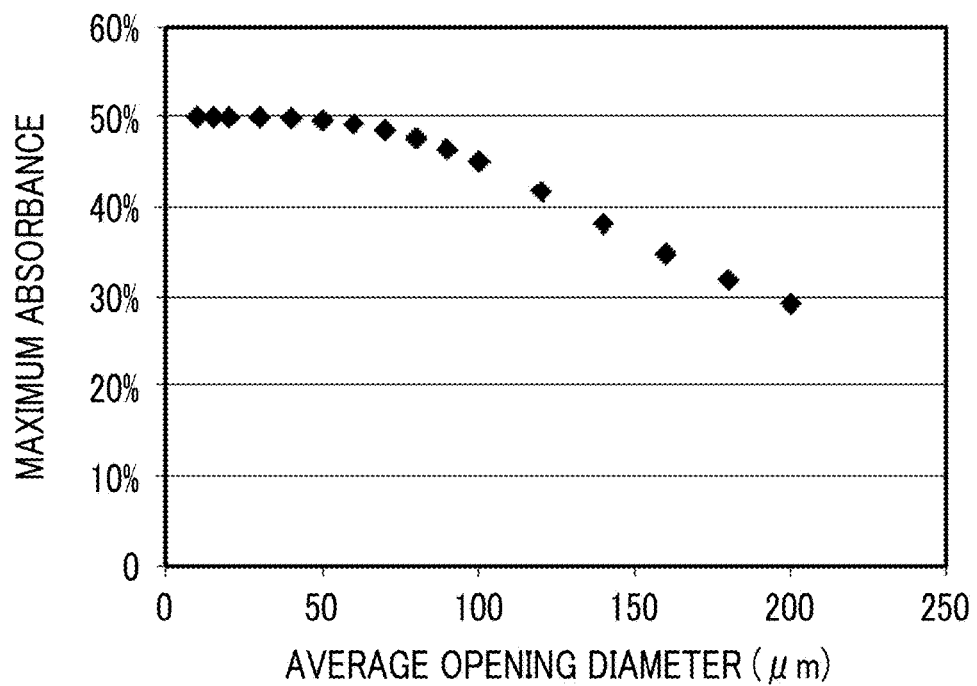
FIG. 20 is a graph showing the relationship between the average opening diameter and the maximum absorbance.

FIG. 19 is a graph showing the relationship between the average opening diameter and the average opening ratio in which the absorbance is maximized, and FIG. 20 is a graph showing the relationship between the maximum value of the absorbance and the average opening diameter. As shown in FIG. 20, in an average opening diameter of 70 μm or greater, it was found that that the maximum value of the absorbance is substantially linearly decreased with respect to the average opening diameter.

Figure 21:
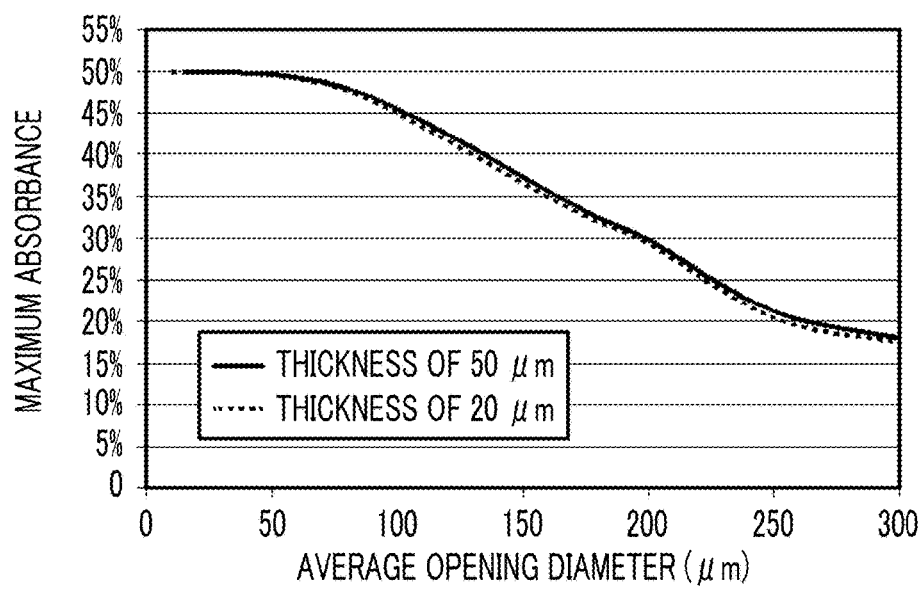
FIG. 21 is a graph showing the relationship between the average opening diameter and the absorbance.

The same simulation as described above was performed by changing the thickness of the plate-like member to 50 μm. FIG. 21 is a graph showing the relationship between the maximum value of the absorbance and the average opening diameter.

In a case where the thickness of the plate-like member is 50 μm, it was found that the maximum value of the absorbance is decreased in an average opening diameter of greater than 70 μm, similar to a case where the thickness of the plate-like member is 20 μm. It was found that the maximum absorbance is determined by the average opening diameter of through-holes regardless of the thickness of the plate-like member. Further, it was found that the maximum absorbance is 50% in a case where the average opening diameter is 50 μm or less and the absorbance is decreased in a case where the average opening diameter is greater than 50 μm. The absorbance is decreased such that the absorbance is 45% in a case where the average opening diameter is 100 μm and the absorbance is 30% in a case where the average opening diameter is 200 μm. Accordingly, it was clarified that the average opening diameter is desirably small.

Based on these results, the maximum value of the absorbance is considered to be robust, which is determined by the average opening diameter without depending on the thickness of the plate-like member.

[Simulation 3]

The simulation for the transmittance, the reflectivity, and the absorbance was performed by fixing the thickness of the plate-like member to 20 μm and the average opening diameter of through-holes to 20 μm and changing the average opening ratio. The results are shown in FIG. 22.

Further, the same simulation as described above was performed by fixing the thickness to 50 μm and the average opening diameter to 20 μm and changing the average opening ratio. The results are shown in FIG. 23.

Figure 22:
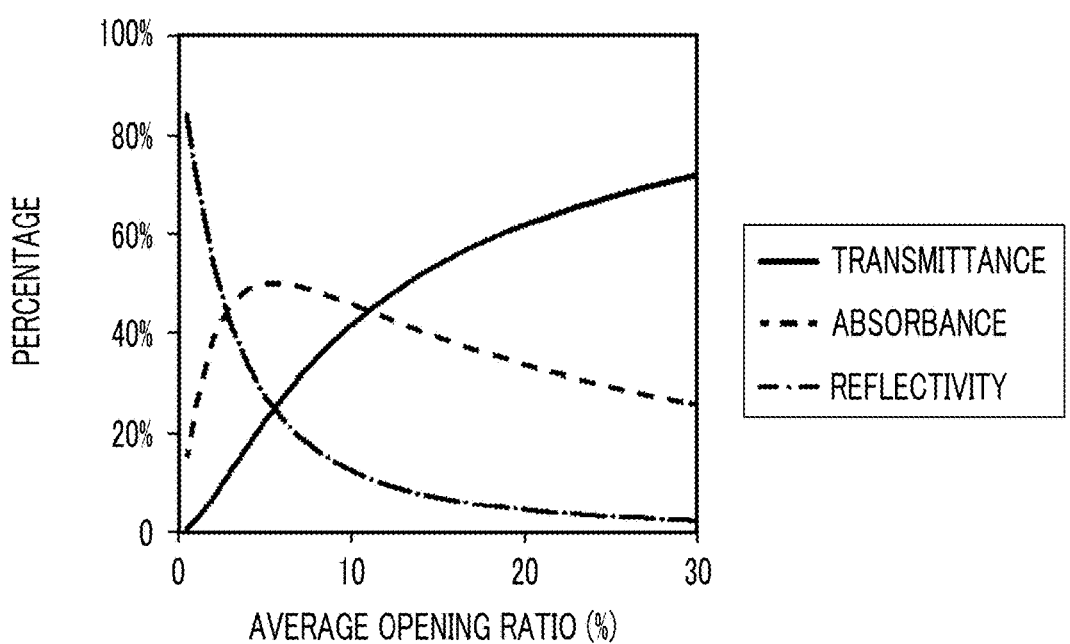
FIG. 22 is a graph showing the relationship between the average opening ratio and the acoustic characteristics.
Figure 23:
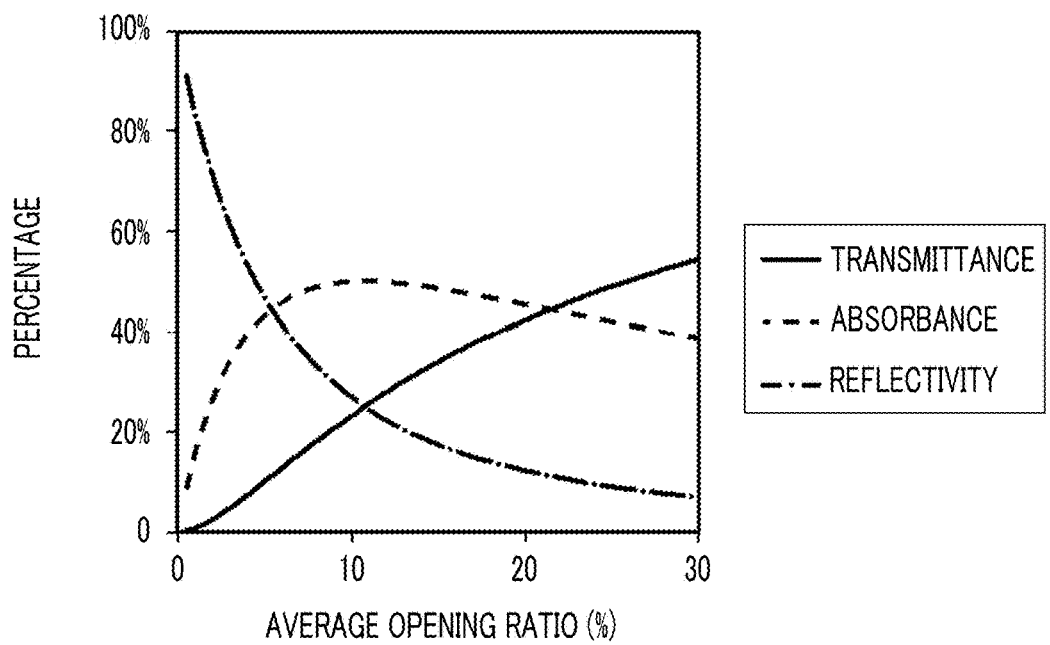
FIG. 23 is a graph showing the relationship between the average opening ratio and the acoustic characteristics.

As shown in FIGS. 22 and 23, the reflection is decreased and the transmission is increased as the average opening ratio is increased. Here, it was clarified that the absorption is maximized under the condition in which the transmission and the reflection are substantially the same as each other. This is the same behavior as in a case where the absorbance with respect to the change of the thickness is maximized, observed in Examples 26 to 30.

Therefore, it was clarified that the transmittance and the reflectivity are the same as each other in a case where the absorption in fine through-holes is maximized.

[Simulation 4]

Based on the results described above, it was clarified that a decrease in the average opening ratio does not result in an increase in absorption and the average opening ratio is maximized depending on the thickness of the plate-like member and the average opening diameter of through-holes.

Further, it was found that a region where the absorption is large gradually spreads about the optimum average opening ratio.

Figure 24:
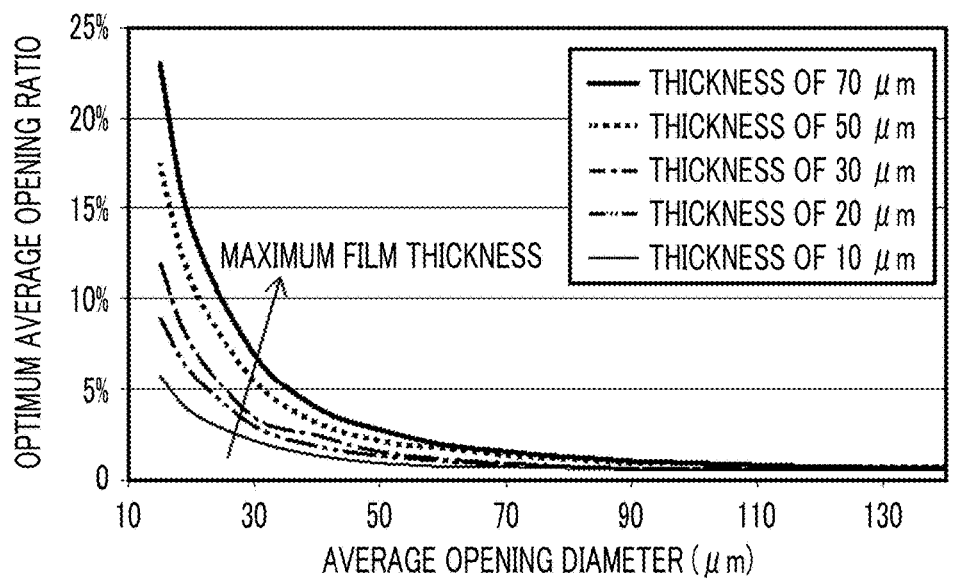
FIG. 24 is a graph showing the relationship between the average opening diameter and the optimum average opening ratio.

In order to determine the optimum average opening ratio, the average opening ratio in which the absorbance is maximized and the absorbance at this time are calculated under respective conditions by changing the average opening diameter of through-holes within a range of 20 μm to 140 μm in each of the thicknesses of the plate-like member of 10 μm, 20 μm, 30 μm, 50 μm, and 70 μm. The results are shown in FIG. 24.

The optimum average opening ratio varies depending on the thickness of the plate-like member in a case where the average opening diameter of through-holes is small. However, the optimum average opening ratio is in a range of 0.5% to 1.0%, which is extremely small, in a case where the average opening diameter of through-holes is approximately 100 μm or greater.

In other words, since the average opening ratio is required to be decreased in order to obtain a large absorbance with through-holes having an average opening diameter of 100 μm or greater, a structure in which both of a high opening ratio and a high absorbance can be achieved is difficult to obtain.

Meanwhile, in the soundproofing structure of the present invention having through-holes with an average opening diameter of less than 100 μm, since the optimum average opening ratio is the function of the average opening diameter, a structure with a high opening ratio can be realized. Further, the maximum absorbance also becomes a large value of 45% or greater as described above, and thus a structure with a high opening ratio and a high absorbance can be realized.

As shown in FIG. 21, the average opening diameter is desirably 80 μm or less in which the maximum absorbance becomes 48% or greater, more desirably 70 μm or less in which the maximum absorbance becomes 49% or greater, and most desirably 50 μm or less in which the maximum absorbance reaches approximately 50%, which is the maximum value.

[Simulation 5]

Hereinbefore, the optimum average opening ratio with respect to the average opening diameter of through-holes was calculated in a case where the average opening diameter was 100 μm or less. In each of the thicknesses of the plate-like member of 10 μm, 20 μm, 30 μm, 50 μm, and 70 μm, the results showing the optimum average opening ratio for each average opening diameter of through-holes are shown by a double-logarithmic graph of FIG. 25. Based on the graph of FIG. 25, it was found that the optimum average opening ratio is changed by a power of −1.6 with respect to the average opening diameter of through-holes.

Figure 25:
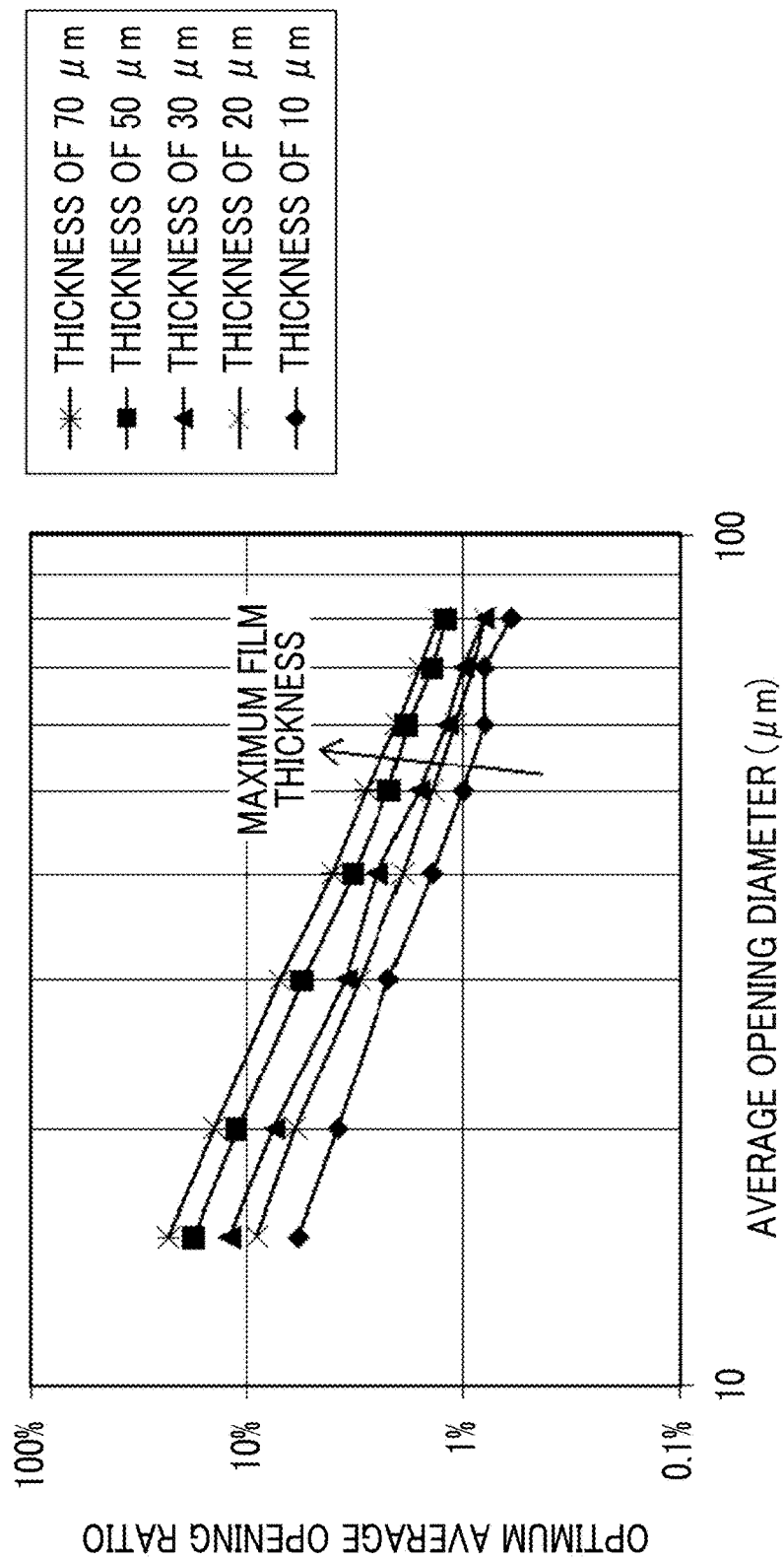
FIG. 25 is a graph showing the relationship between the average opening diameter and the optimum average opening ratio.

More specifically, in a case where the optimum average opening ratio is set as rho_center, the average opening diameter of through-holes is set as phi (μm), and the thickness of the plate-like member is set as t (μm), it was clarified that the optimum average opening ratio rho_center is determined as rho_center=a×phi$^{-1.6}$ (a=2+0.25×t) by approximating the double-logarithmic graph of FIG. 25 with the power math function.

In this manner, it was clarified that a decrease in the average opening ratio does not result in an increase in absorbance and the maximum average opening ratio is determined by the thickness of the plate-like member and the average opening diameter of through-holes, particularly in a case where the average opening diameter of through-holes is small. The optimum average opening ratio is increased as the thickness of the plate-like member is increased and is decreased as the average opening diameter is increased.

Figure 26:
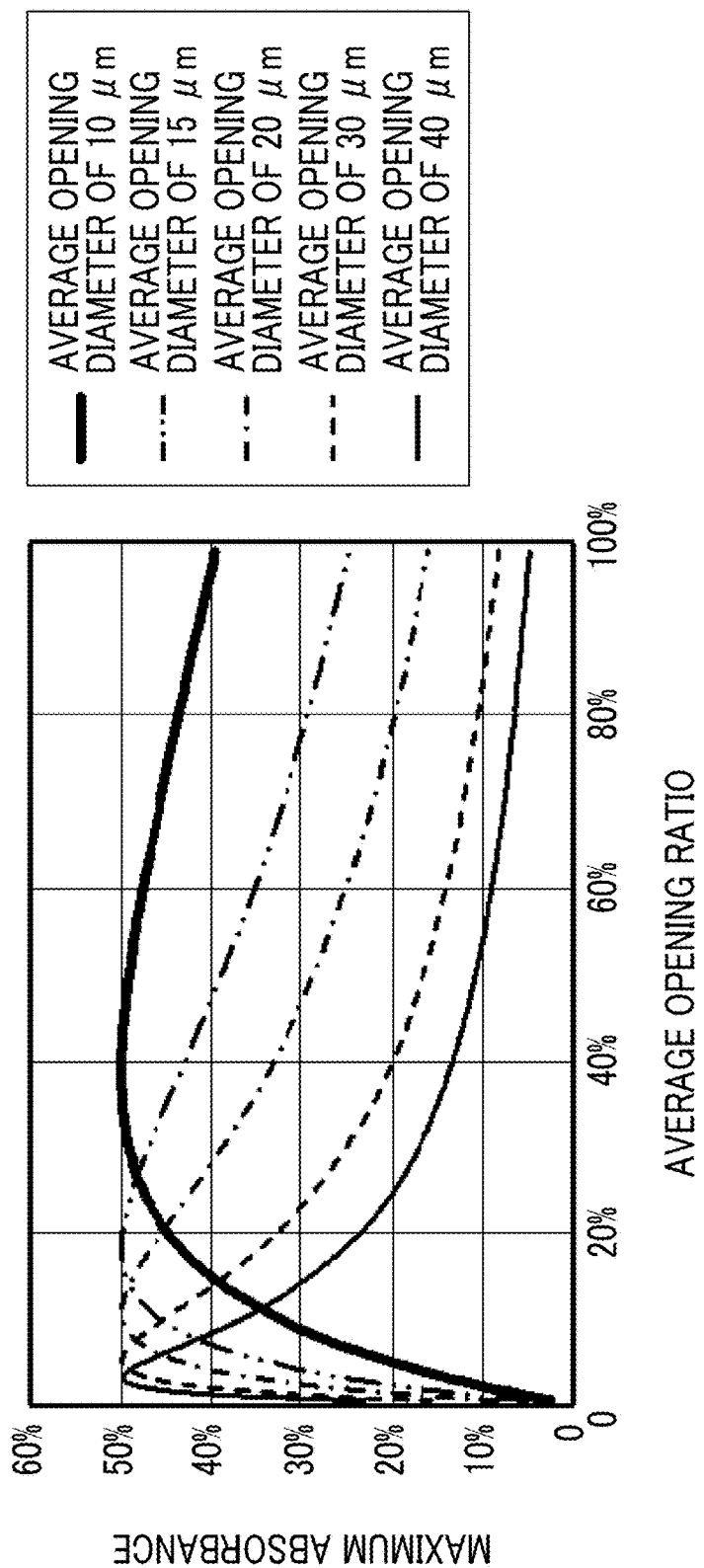
FIG. 26 is a graph showing the relationship between the average opening ratio and the maximum absorbance.

As described above, a region where the absorbance is large gradually spreads about the optimum average opening ratio. For detailed analysis, the results obtained by changing the average opening ratio in the simulation of the plate-like member having a thickness of 50 μm are shown in FIG. 26. The average opening ratio was changed from 0.5% to 99% by setting each of the average opening diameters of through-holes to 10 μm, 15 μm, 20 μm, 30 μm, and 40 μm.

In all average opening diameters, the range of the average opening ratio where the absorbance is increased spreads around the optimum average opening ratio. Characteristically, in a case where the average opening diameter of through-holes is small, the range of the average opening ratio where the absorbance is increased expands. Further, the range where the absorbance is increased becomes larger in a case where the average opening ratio is higher than the optimum average opening ratio.

Since the maximum value of the absorbance is approximately 50% in an average opening diameter in a case where the average opening diameter is 0.1 μm or greater and less than 100 μm, the lower limits of the opening ratio and the upper limits of the opening ratio in which the absorbance is 30%, 40%, and 45% are listed in Table 5. Further, the range of each absorbance from the optimum average opening ratio is listed in Table 6.

For example, the optimum average opening ratio is 11% in a case where the average opening diameter of through-holes is 20 μm, and the lower limit of the average opening ratio in which the absorbance is 40% or greater is 4.5% and the upper limit thereof is 28%. At this time, since the range of the average opening ratio in which the absorbance is 40% with respect to the optimum average opening ratio is "(4.5%−11.0%)=−6.5% to (28.0%−11.0%)=17.0%", the range of −6.5% to 17.0% is listed in Table 6.

TABLE 6

| Average opening diameter | Range from optimum average opening ratio | | |
|---|---|---|---|
| | Within range of 45% | Within range of 40% | Within range of 30% |
| 10 μm | −18.5% to 34% | −24.0% to 57.0% | −30.0% to |
| 15 μm | −8.0% to 16.5% | −10.5% to 29.5% | −13.0% to 59.5% |
| 20 μm | −5.0 to 9.5% | −6.5% to 17.0% | −8.5% to 35.0% |
| 30 μm | −2.5% to 4.5% | −3.0% to 8.0% | −4.0% to 17.5% |
| 40 μm | −1.0% to 3.0% | −1.5%~5.0% | −2.0% to 11.0% |

As listed in Table 6, the widths of the absorbances for each average opening diameter of through-holes are compared. As the result, in a case where the average opening diameter of through-holes is set as phi (μm), the width of the absorbance is changed by a ratio of approximately 100×phi$^{-2}$. Accordingly, an appropriate range for each average opening diameter with respect to each of the absorbances of 30%, 40%, and 45% can be determined.

In other words, the range of the absorbance of 30% is determined using the above-described optimum average opening ratio rho_center and the range in a case where the average opening diameter of the through-holes is 20 μm as a reference. Accordingly, it is necessary that the absorbance falls in a range where rho_center−0.085×(phi/20)$^{-2}$ is the lower limit of the average opening ratio and rho_center+0.35×(phi/20)$^{-2}$ is the upper limit of the average opening ratio. In this case, the range of the average opening ratio is limited to be greater than 0 and less than 1 (100%).

The range of the absorbance of 40% is desirable. It is desirable that the absorbance falls in a range where rho_center−0.24×(phi/10)$^{-2}$ is the lower limit of the average opening ratio and rho_center+0.57×(phi/10)$^{-2}$ is the upper limit of the average opening ratio. Here, in order to minimize the error as much as possible, the reference of the average opening diameter is set as 10 μm.

The range of the absorbance of 45% is more desirable. It is more desirable that the absorbance falls in a range where rho_center−0.185×(phi/10)$^{-2}$ is the lower limit of the average opening ratio and rho_center+0.34×(phi/10)$^{-2}$ is the upper limit of the average opening ratio.

Figure 27:
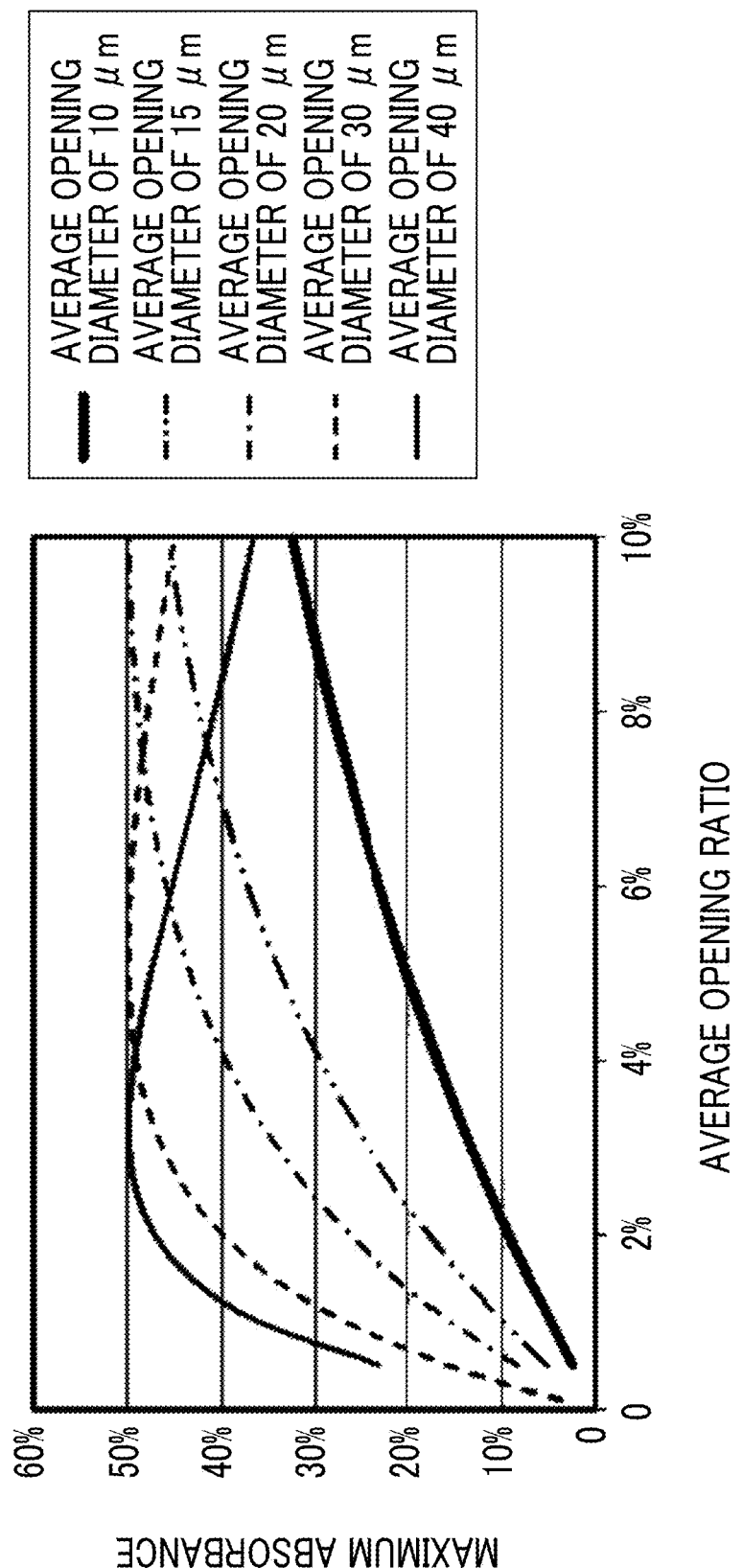
FIG. 27 is a graph showing the relationship between the average opening ratio and the maximum absorbance.

Further, in order to determine the range of the optimum average opening ratio in a case where the absorbance is small, the range is finely calculated within the range where the average opening ratio is small. As a representative example, the results obtained in a case where the thickness of the plate-like member is 50 μm and the average opening diameter of through-holes is 30 μm are shown in FIG. 27.

In each of the absorbances of 10%, 15%, and 20%, the range of the average opening ratio at which this absorbance is obtained and the approximate expression are listed in Table 7 and Table 8. Further, "rho_center" is written as "rc" in Table 8.

TABLE 5

| Average opening diameter | Optimum average opening diameter | Within range of 30% | | Within range of 40% | | Within range of 45% | |
|---|---|---|---|---|---|---|---|
| | | Lower limit | Upper limit | Lower limit | Upper limit | Lower limit | Upper limit |
| 10 μm | 39.0% | 9.0% | Greater than 99% | 15.0% | 96.0% | 20.5% | 73.0% |
| 15 μm | 17.5% | 4.5% | 77.0% | 7.0% | 47.0% | 9.5% | 34.0% |
| 20 μm | 11.0% | 2.5% | 46.0% | 4.5% | 28.0% | 6.0% | 20.5% |
| 30 μm | 5.5% | 1.5% | 23.0% | 2.5% | 13.5% | 3.0% | 10.0% |
| 40 μm | 3.0% | 1.0% | 14.0% | 1.5% | 8.0% | 2.0% | 6.0% |

TABLE 7

| Average opening diameter | Optimum average opening ratio | Range of 10% | | Range of 15% | | Range of 20% | |
|---|---|---|---|---|---|---|---|
| | | Lower limit | Upper limit | Lower limit | Upper limit | Lower limit | Upper limit |
| 30 μm | 5.5% | 0.3% | 85.0% | 0.5% | 56.0% | 0.7% | 40.0% |

TABLE 8

| | Lower limit | Upper limit |
|---|---|---|
| Range of 10% | $rc - 0.052 \times (phi/30)^{-2}$ | $rc + 0.795 \times (phi/30)^{-2}$ |
| Range of 15% | $rc - 0.050 \times (phi/30)^{-2}$ | $rc + 0.505 \times (phi/30)^{-2}$ |
| Range of 20% | $rc - 0.048 \times (phi/30)^{-2}$ | $rc + 0.345 \times (phi/30)^{-2}$ |

As listed in Tables 7 and 8, the range of the absorbance of 10% is determined using the above-described optimum average opening ratio rho_center and the range in a case where the average opening diameter of the through-holes is 30 μm as a reference. Accordingly, it is necessary that the absorbance falls in a range where rho_center−0.052×(phi/30)$^{-2}$ is the lower limit of the average opening ratio and rho_center+0.795×(phi/30)$^{-2}$ is the upper limit of the average opening ratio. In this case, the range of the average opening ratio is limited to be greater than 0 and less than 1 (100%).

The range of the absorbance of 15% or greater is desirable. It is desirable that the absorbance falls in a range where rho_center−0.050×(phi/30)$^{-2}$ is the lower limit of the average opening ratio and rho_center+0.505×(phi/30)$^{-2}$ is the upper limit of the average opening ratio.

The range of the absorbance of 20% or greater is more desirable. It is more desirable that the absorbance falls in a range where rho_center−0.048×(phi/30)$^{-2}$ is the lower limit of the average opening diameter and rho_center+0.345×(phi/30)$^{-2}$ is the upper limit of the average opening ratio.

It is still more desirable that the above-described absorbance falls within the range of the average opening ratio in which the absorbance is 30% or greater, 40% or greater, or 45% or greater, and the absorbance can be further increased.

As described above, the characteristics of the sound absorption phenomenon caused by the friction inside the through-holes were clarified based on the simulations. Further, the range of the absorbance was determined by the thickness of the plate-like member and the average opening diameter and the average opening ratio of the through-holes, and the range of the optimum value was also determined.

Based on the description above, the effects of the present invention are apparent.

EXPLANATION OF REFERENCES 10, 20: soundproofing structure
11: aluminum substrate
12: plate-like member
13: aluminum hydroxide film
14: through-hole
30: soundproofing member
32: cover
50: pipe
52: noise source

What is claimed is:

1. A soundproofing structure comprising:
a plate-like member which has a plurality of through-holes passing therethrough in a thickness direction,
wherein an average opening diameter of the through-holes is 0.1 μm or greater and less than 100 μm, and
in a case where the average opening diameter of the through-holes is set as phi (μm) and a thickness of the plate-like member is set as t (μm), an average opening ratio rho of the through-holes is greater than 0 and less than 1 and falls in a range where a center is rho_center= $(2+0.25 \times t) \times phi^{-1.6}$, a lower limit is rho_center−(0.052× (phi/30)$^{-2}$), and an upper limit is rho_center+(0.795× (phi/30)$^{-2}$).

2. The soundproofing structure according to claim 1, wherein the average opening ratio of the plurality of through-holes is 2% or greater.

3. The soundproofing structure according to claim 1, wherein a plurality of the plate-like members are arranged in the thickness direction.

4. The soundproofing structure according to claim 2, wherein a plurality of the plate-like members are arranged in the thickness direction.

5. The soundproofing structure according to claim 1, wherein a surface roughness Ra of an inner wall surface of the through-hole is in a range of 0.1 μm to 10.0 μm.

6. The soundproofing structure according to claim 2, wherein a surface roughness Ra of an inner wall surface of the through-hole is in a range of 0.1 μm to 10.0 μm.

7. The soundproofing structure according to claim 3, wherein a surface roughness Ra of an inner wall surface of the through-hole is in a range of 0.1 μm to 10.0 μm.

8. The soundproofing structure according to claim 4, wherein a surface roughness Ra of an inner wall surface of the through-hole is in a range of 0.1 μm to 10.0 μm.

9. The soundproofing structure according to claim 1, wherein an inner wall surface of the through-hole is formed in a shape of a plurality of particles, and
an average particle diameter of projections formed on the inner wall surface is in a range of 0.1 μm to 10.0 μm.

10. The soundproofing structure according to claim 2, wherein an inner wall surface of the through-hole is formed in a shape of a plurality of particles, and
an average particle diameter of projections formed on the inner wall surface is in a range of 0.1 μm to 10.0 μm.

11. The soundproofing structure according to claim 3, wherein an inner wall surface of the through-hole is formed in a shape of a plurality of particles, and
an average particle diameter of projections formed on the inner wall surface is in a range of 0.1 μm to 10.0 μm.

12. The soundproofing structure according to claim 1, wherein a material for forming the plate-like member is a metal.

13. The soundproofing structure according to claim 1, wherein a material for forming the plate-like member is aluminum.

14. The soundproofing structure according to claim 1, wherein the plurality of through-holes are randomly arranged.

15. The soundproofing structure according to claim 1, wherein the plurality of through-holes are formed of through-holes with two or more different opening diameters.

16. The soundproofing structure according to claim 1, wherein the average opening diameter of the through-holes is in a range of 0.1 µm to 50 µm.

17. The soundproofing structure according to claim 1, wherein at least some of the through-holes have a shape having a maximum diameter inside the through-holes.

18. A partition structure comprising:
the soundproofing structure according to claim 1.

19. A window member comprising:
the soundproofing structure according to claim 1.

20. A cage comprising:
the soundproofing structure according to claim 1.

\* \* \* \* \*